June 15, 1954　　M. E. FRANCISCO　　2,681,089
PITTING AND STUFFING APPARATUS
Filed Aug. 6, 1949　　13 Sheets-Sheet 1

INVENTOR.
MARSHALL E. FRANCISCO
BY
ATTORNEYS

June 15, 1954  M. E. FRANCISCO  2,681,089
PITTING AND STUFFING APPARATUS
Filed Aug. 6, 1949  13 Sheets-Sheet 2

INVENTOR.
MARSHALL E. FRANCISCO
BY
ATTORNEYS

June 15, 1954  M. E. FRANCISCO  2,681,089
PITTING AND STUFFING APPARATUS
Filed Aug. 6, 1949  13 Sheets-Sheet 3
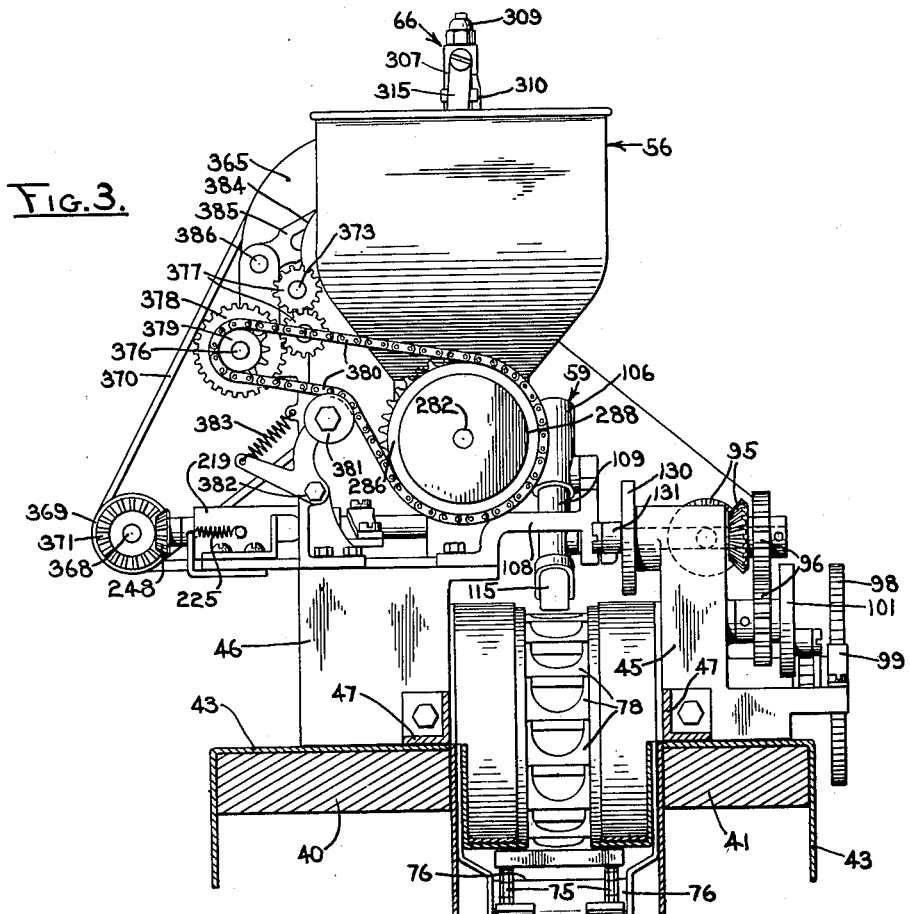
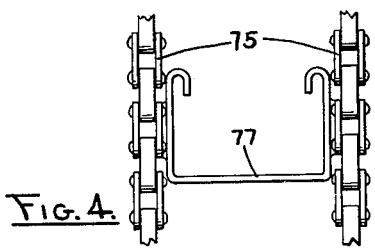
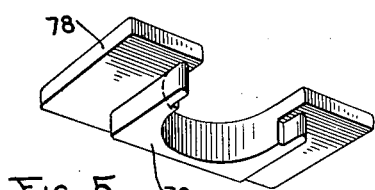
INVENTOR.
MARSHALL E. FRANCISCO
BY
ATTORNEYS June 15, 1954   M. E. FRANCISCO   2,681,089
PITTING AND STUFFING APPARATUS
Filed Aug. 6, 1949   13 Sheets-Sheet 4
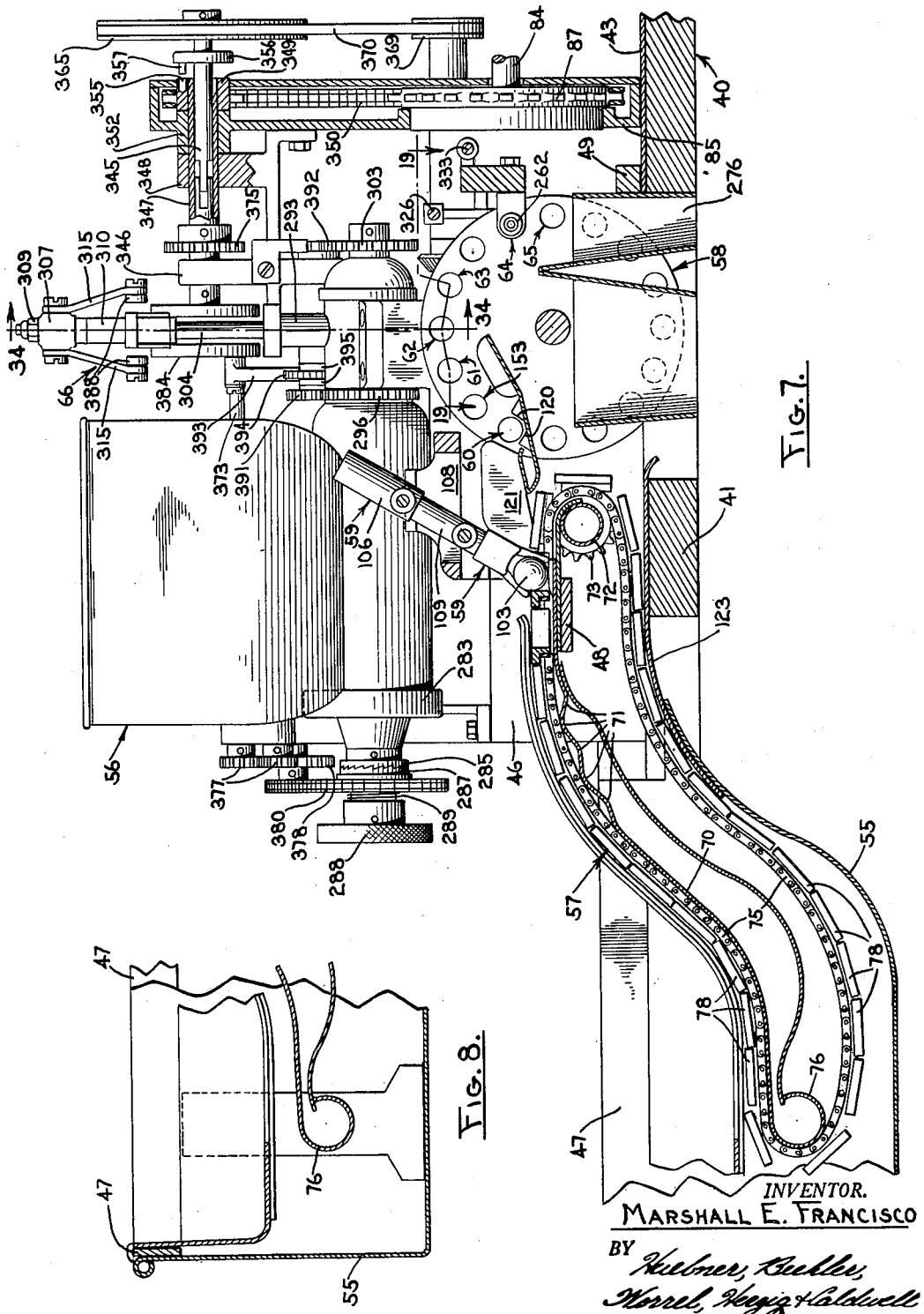
INVENTOR.
MARSHALL E. FRANCISCO
BY
ATTORNEYS

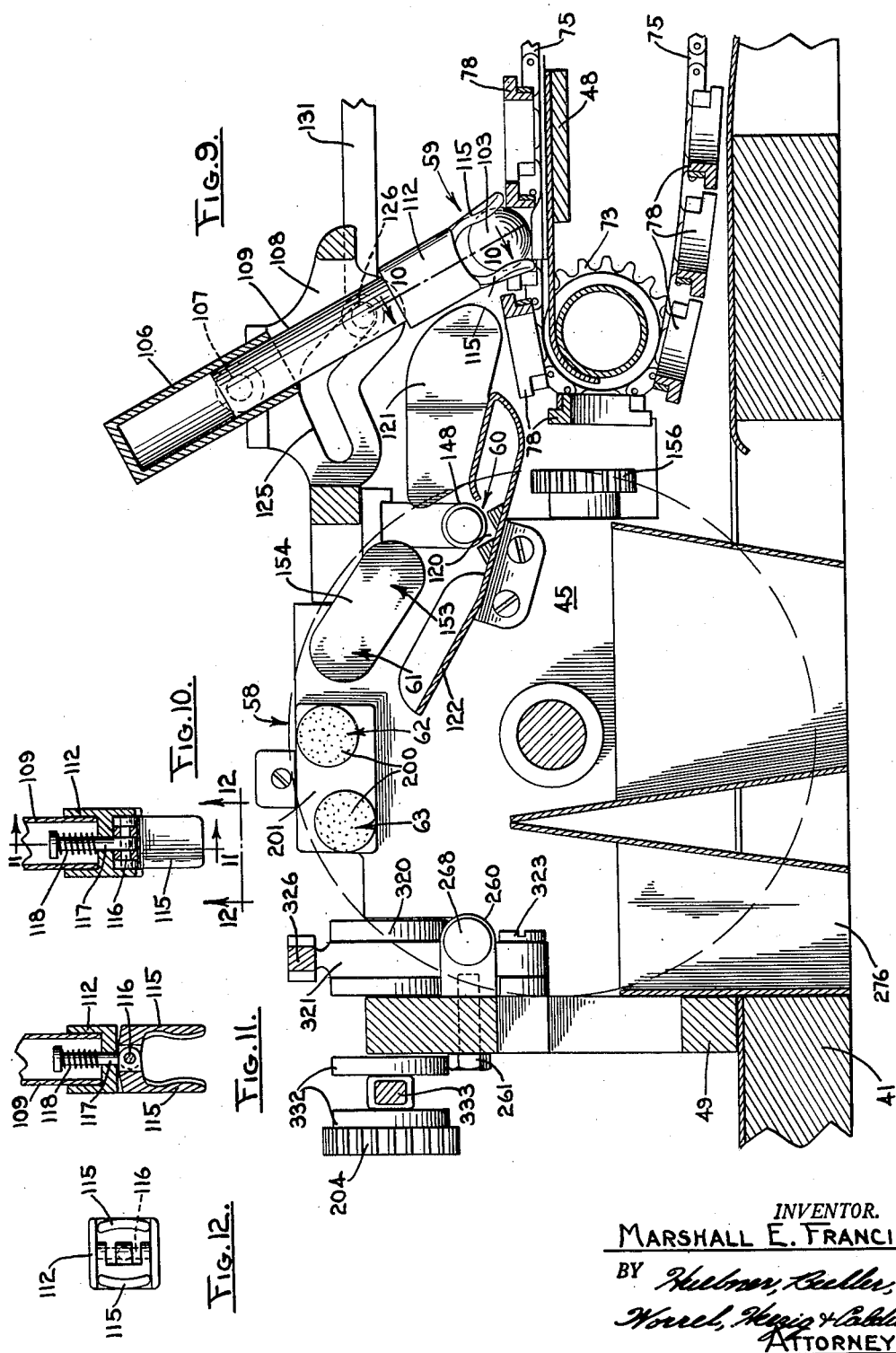

June 15, 1954  M. E. FRANCISCO  2,681,089
PITTING AND STUFFING APPARATUS
Filed Aug. 6, 1949  13 Sheets-Sheet 7

INVENTOR.
MARSHALL E. FRANCISCO
BY
ATTORNEYS

June 15, 1954   M. E. FRANCISCO   2,681,089
PITTING AND STUFFING APPARATUS
Filed Aug. 6, 1949   13 Sheets-Sheet 9
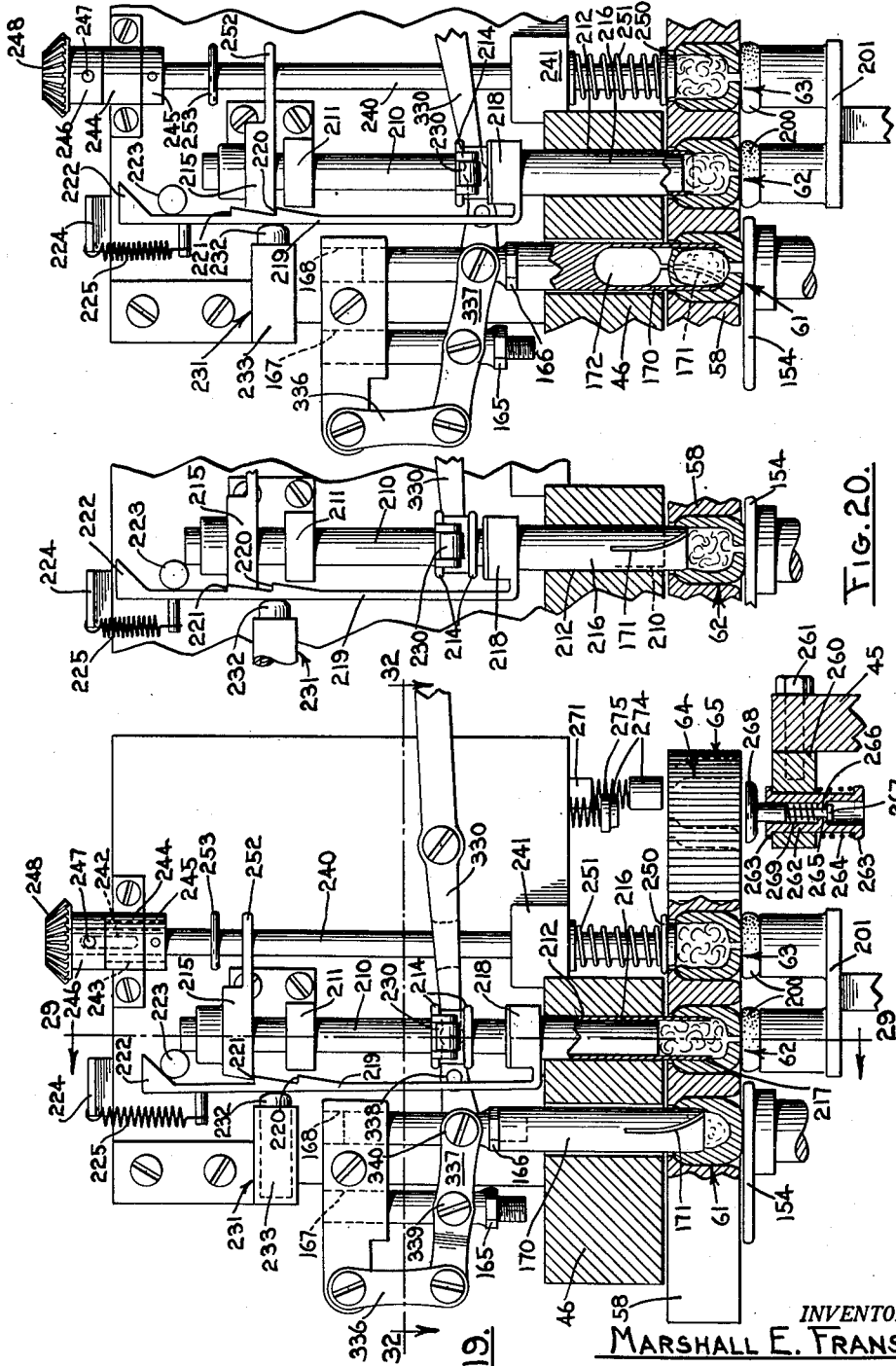
INVENTOR.
MARSHALL E. FRANSISCO
BY
ATTORNEYS June 15, 1954
M. E. FRANCISCO
2,681,089
PITTING AND STUFFING APPARATUS
Filed Aug. 6, 1949
13 Sheets-Sheet 10
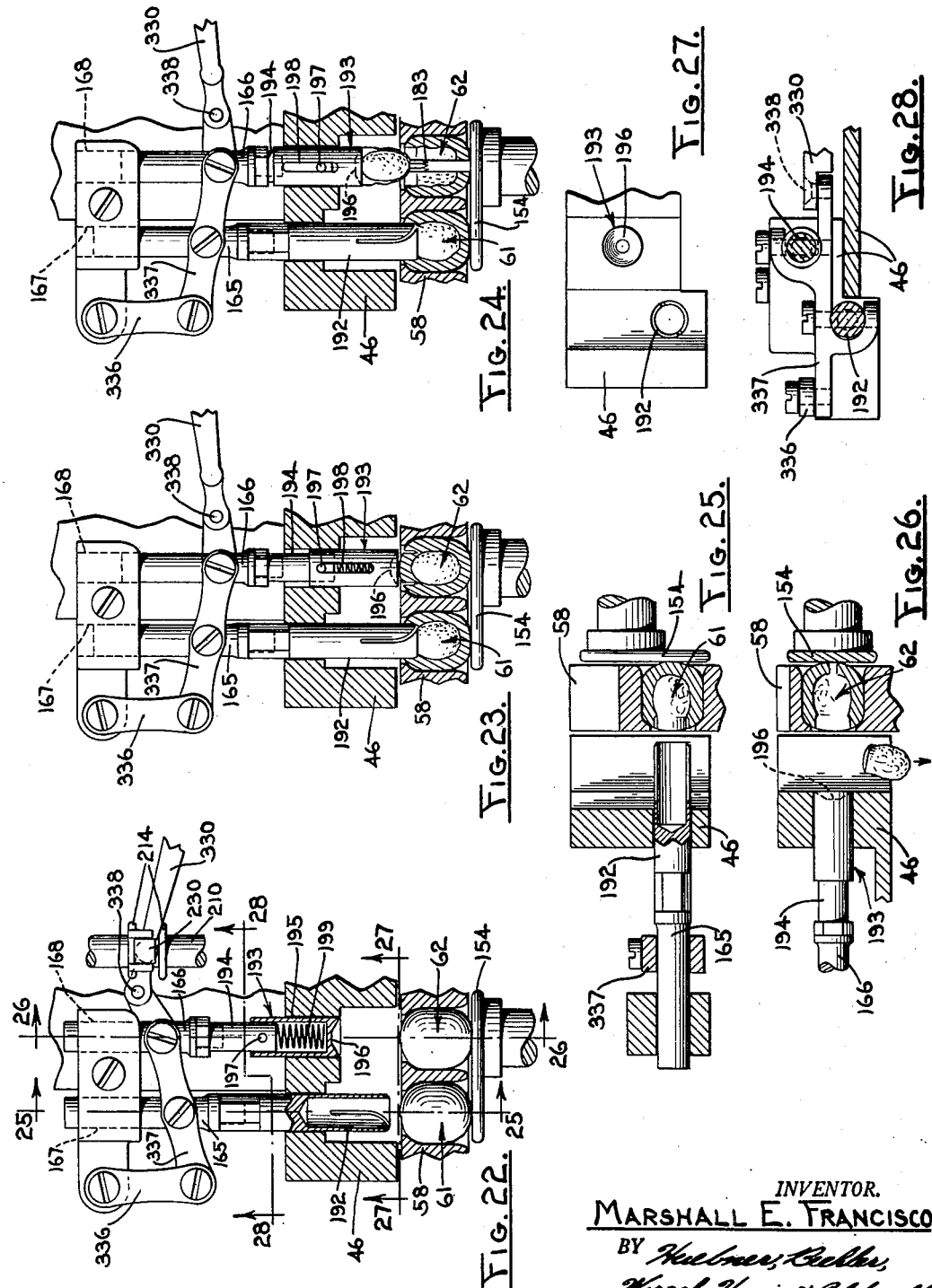

June 15, 1954     M. E. FRANCISCO     2,681,089
PITTING AND STUFFING APPARATUS
Filed Aug. 6, 1949     13 Sheets-Sheet 11

INVENTOR.
MARSHALL E. FRANCISCO
BY
ATTORNEYS

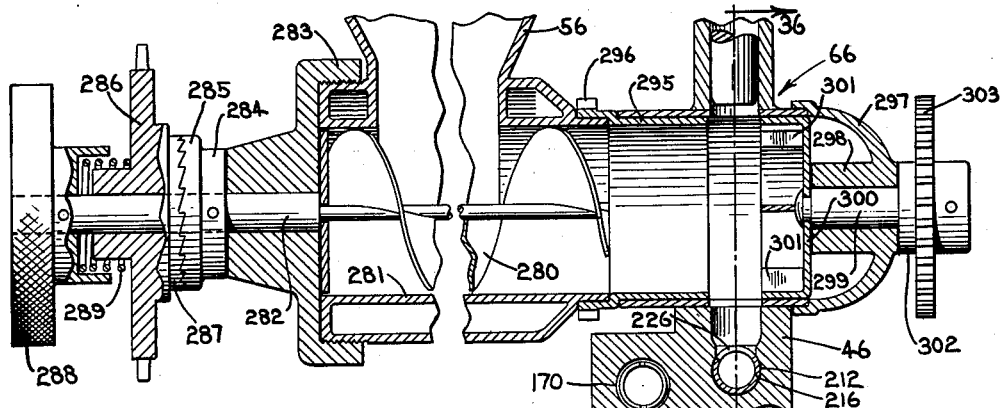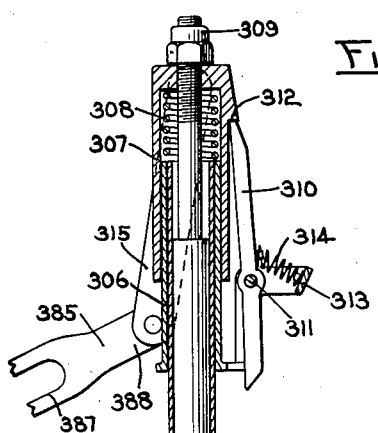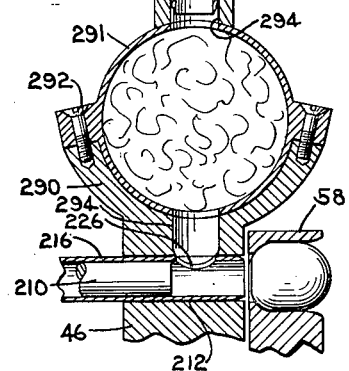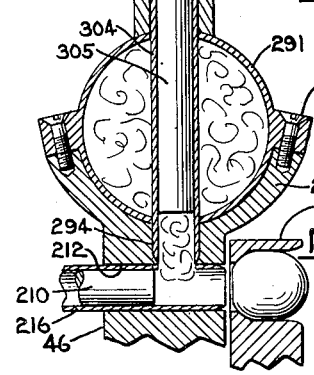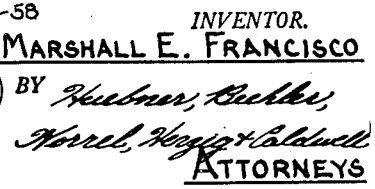

June 15, 1954  M. E. FRANCISCO  2,681,089
PITTING AND STUFFING APPARATUS
Filed Aug. 6, 1949  13 Sheets-Sheet 13

INVENTOR.
MARSHALL E. FRANCISCO
BY
ATTORNEYS

Patented June 15, 1954

2,681,089

UNITED STATES PATENT OFFICE 2,681,089

PITTING AND STUFFING APPARATUS

Marshall E. Francisco, San Jose, Calif.

Application August 6, 1949, Serial No. 111,060

5 Claims. (Cl. 146—27)

The present invention relates to the fruit processing industry and more particularly to an automatic apparatus adapted to receive whole fruit and stuffing material separately in bulk and to discharge independently pits removed from such fruit and the pitted fruit having the cavities formed by pit removal packed with stuffing material.

Prior to the present invention it has been considered impossible automatically to pit and to stuff fruit, such as olives, dates, cherries and the like, in a machine. In fact, the stuffing operation has uniformly been performed by hand methods employed for as long as fruit stuffing has been a commercial endeavor.

Hand stuffing of fruit is necessarily a time consuming and expensive operation. Further, the results lack desired uniformity. The labor incident to hand stuffing has restricted the commercial stuffing of olives and other fruits to countries in which hand labor is relatively inexpensive, necessitating the preliminary packing of stuffed fruits in containers such as barrels, the transportation of the stuffed fruit to countries in which they are to be sold, and their subsequent re-packing in smaller containers for sale. This needless duplication of handling presents obvious sanitation problems and excessive production and marketing labor expenses. The transporting and repeated handling frequently dislodge stuffing material from fruit in which it has been placed and it is not unusual to experience a 30% loss of the stuffed fruit between the completion of the stuffing operation and the final packing in containers for retail sale.

The aforesaid stuffing, handling and transporting expenses have resulted in excessive sale prices for stuffed fruits seriously limiting their demand and making it impossible to take advantage of the full potential market. Stuffed olives, for example, remain a luxury item, because of their high cost, in spite of an apparent great potential demand.

A general object of the present invention is to make possible the economical production of stuffed fruits whereby consumers may readily make their potential demands effective, the producers of stuffed fruits enjoy increased sales, and the farmers who raise the fruit increased outlets for their produce.

The present invention has as a primary object the provision of an apparatus adapted to handle a continuous supply of fruit in bulk delivered to a hopper, automatically to core, to pit, and to stuff the individual fruit, and to deliver the fruit with the stuffing uniformly compacted therein.

Another object is to provide a unitary construction suited to the pitting and stuffing of fruit.

Another object is to obviate the hand labor and difficulties incident thereto heretofore required in the stuffing of fruit.

Another object is to provide a fruit pitting and stuffing apparatus adapted to stuff the fruit so as to retain the stuffing material dependably during subsequent handling, packaging, bottling, and/or storing thereof.

Another object is to provide an improved carrier in fruit handling apparatus suited to the holding of fruit for pitting, stuffing, and like operations.

Another object is to provide a machine adapted mechanically to stuff the pit wells of fruit previously pitted.

Another object is to provide in a fruit stuffing machine, means for locating fruit having a stuffing receiving cavity formed therein in a predetermined attitude, to extend a stuffing tube into the cavity, to compact stuffing material in the cavity, and to retract the tube from the fruit.

Another object is to provide in a fruit pitting and stuffing machine means for polishing externally disposed stuffing material located in a cavity of a fruit.

Further objects are to provide improved elements and arrangements thereof in a device of the character and for the purposes set forth that are simple in structure, dependable in operation, and economical to employ.

Further objects and advantages will become apparent in the subsequent description in the specification.

In the drawings:

Fig. 3 is a vertical section of the device shown in Fig. 1 taken along line 3—3.

Fig. 4 is a fragmentary plan view on an enlarged scale of a conveyor employed in the device of the present invention having a fruit engaging portion thereof removed for illustrative convenience.

Fig. 5 is a perspective view of a fruit engaging element which is adapted to be releasably mounted in the structure shown in Fig. 4.

Fig. 6 demonstrates the association of the fruit engaging element of Fig. 5 in the portions of the conveyor shown in Fig. 4.

Figure 2:
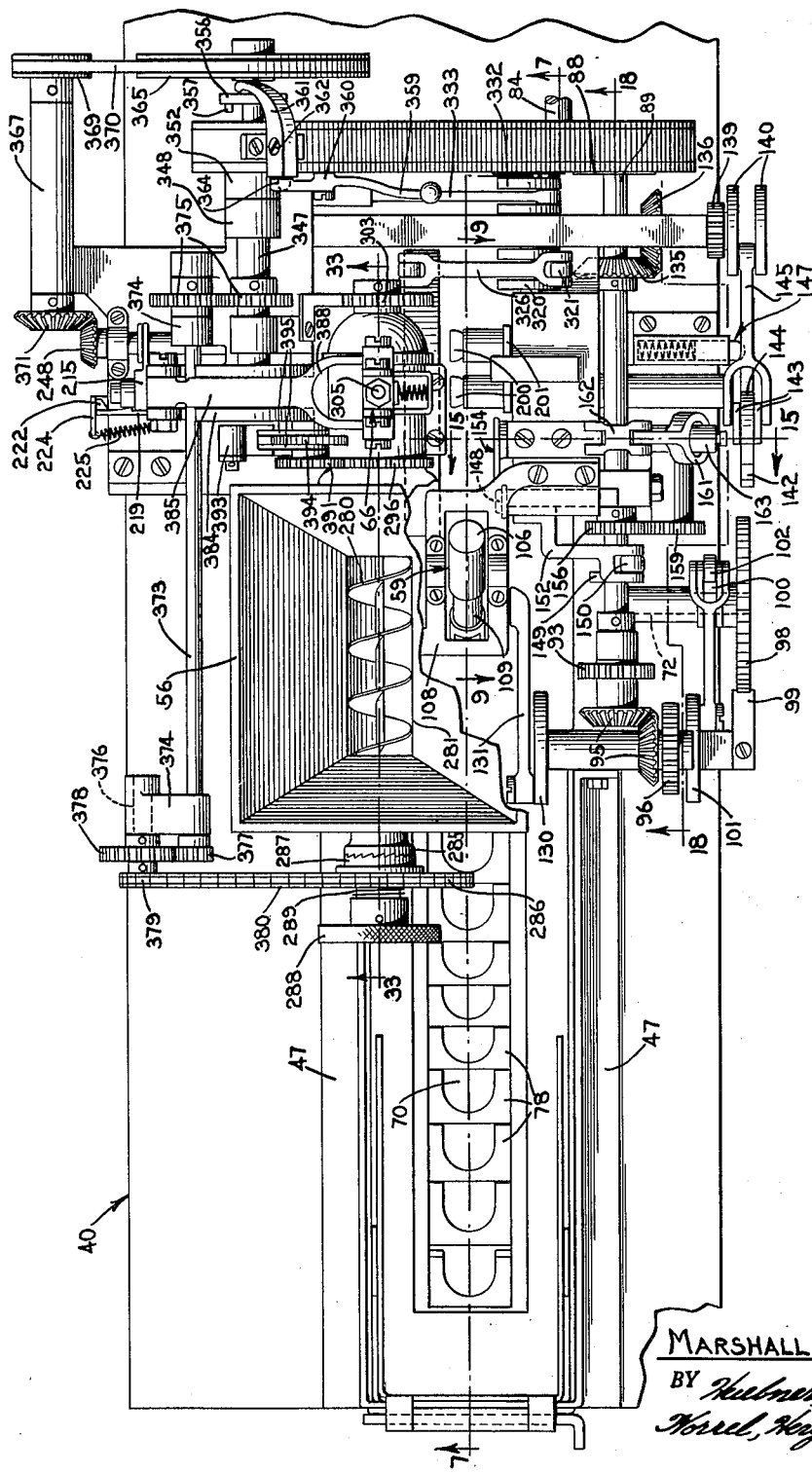
Fig. 2 is a fragmentary plan view of the machine shown in Fig. 1 having a portion of a hopper adapted to receive stuffing material broken away to reveal subjacent details of structure.

Fig. 7 is a fragmentary vertical longitudinal section on an enlarged scale of the automatic fruit pitting and stuffing machine, as viewed from line 7—7 in Fig. 2.

In order to accommodate Fig. 7 in the scale employed, it has been necessary to break off a portion of a fruit receiving hopper thereof. This portion is shown in vertical section in Fig. 8.

Fig. 9 is an enlarged fragmentary sectional view taken on line 9—9 of Fig. 2 and showing in phantom line a fruit carrier located on the opposite side of line 9—9 from the structure shown, for purposes of illustrating structural relationships.

Fig. 10 is a longitudinal sectional view of a mechanical hand illustrated in Fig. 9, as taken on line 10—10 thereof.

Fig. 11 is a sectional view of the hand as viewed from line 11—11 in Fig. 10.

Fig. 12 is an end view of the hand as viewed from line 12—12 in Fig. 10.

Figure 1:
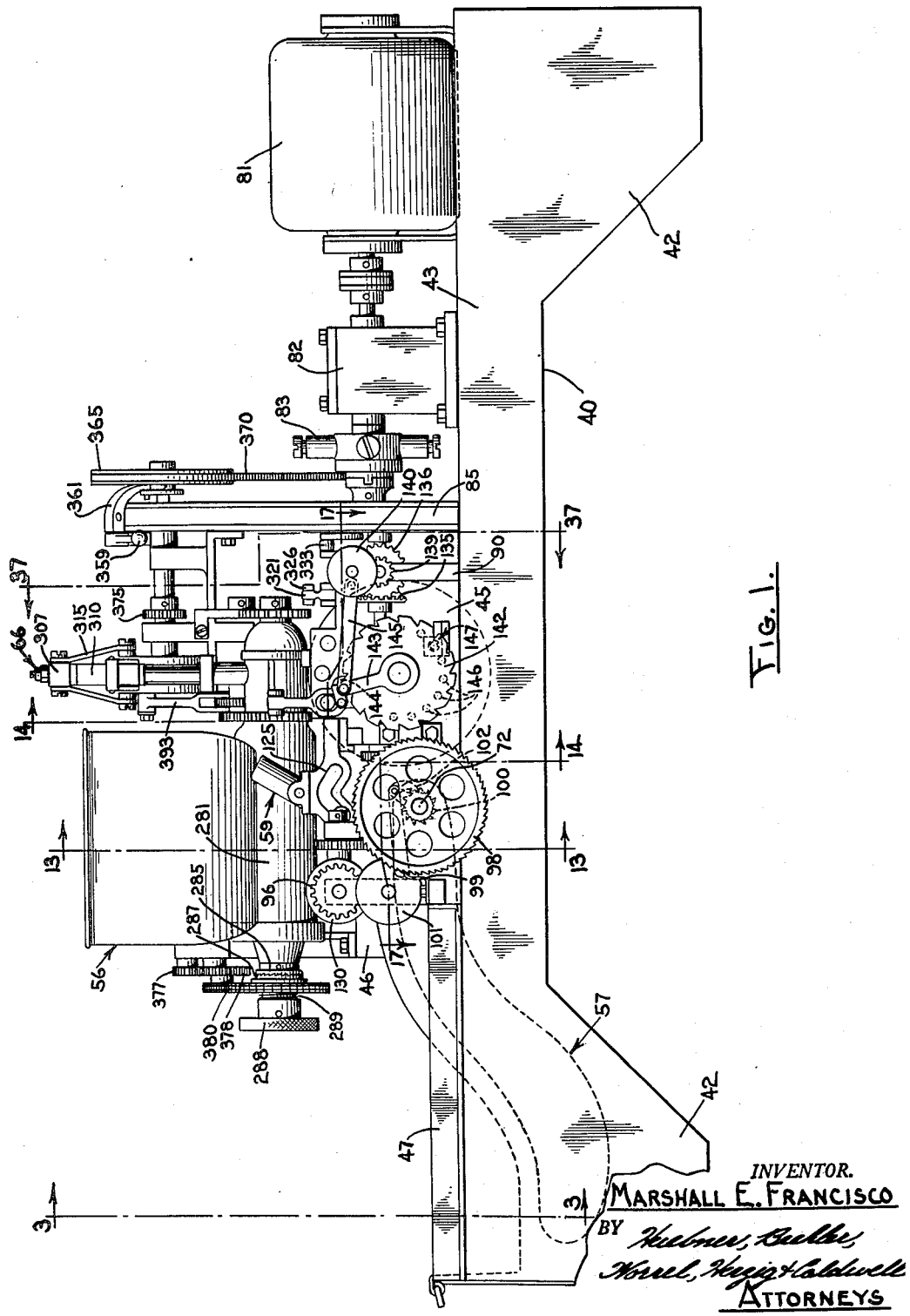
Fig. 1 is a side elevation of an automatic fruit pitting and stuffing machine embodying the principles of the present invention.
Figure 13:
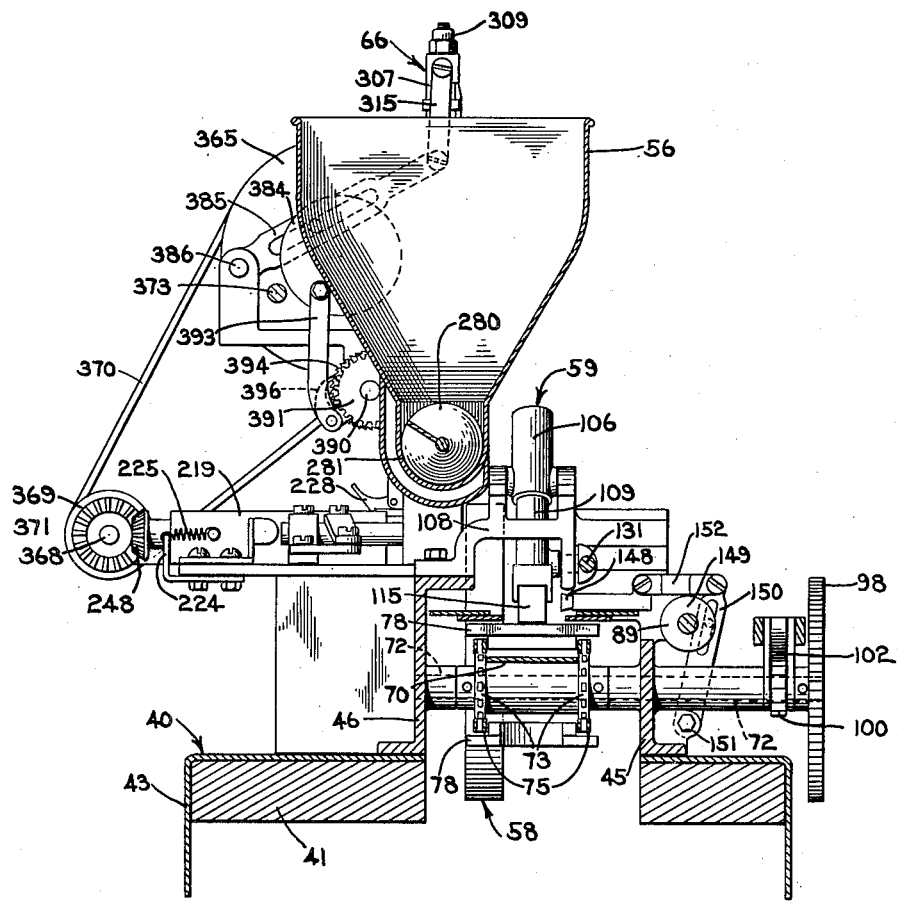

Fig. 13 is a vertical transverse sectional view of the fruit pitting and stuffing machine as taken on line 13—13 of Fig. 1.

Figure 14:
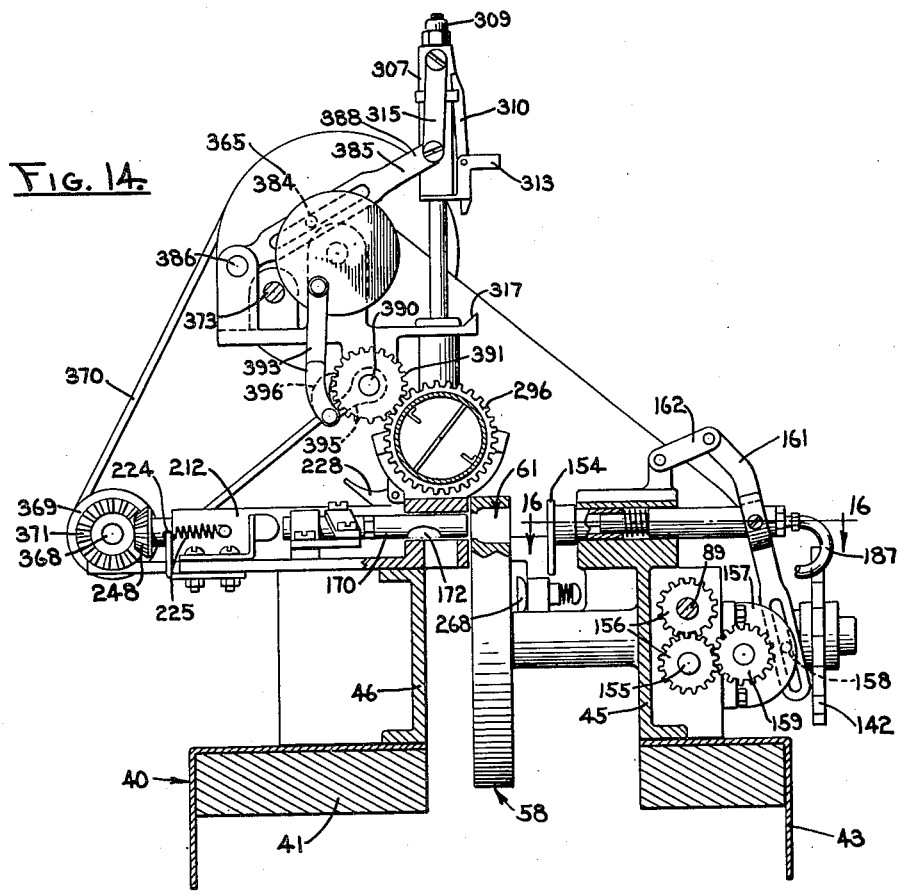

Fig. 14 is an enlarged vertical transverse sectional view of the machine taken on line 14—14 of Fig. 1.

Figures 15, 16:
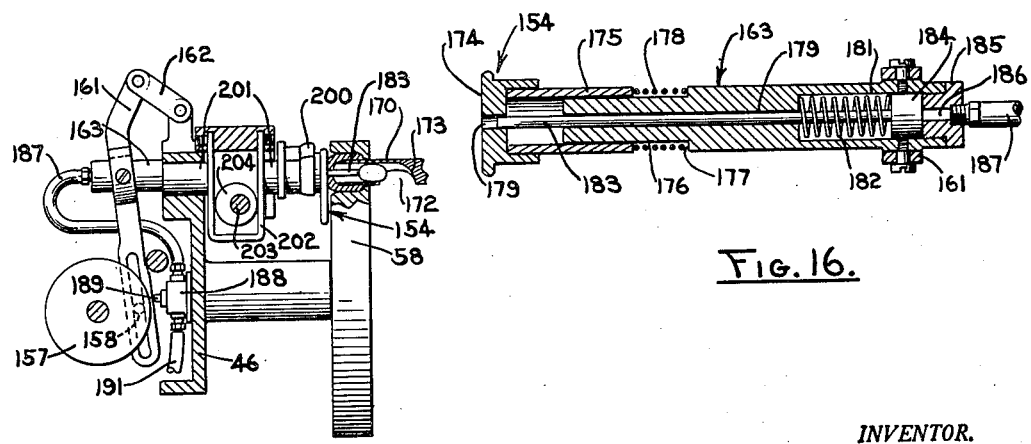

Fig. 15 is a fragmentary enlarged sectional view of a fruit pitting station of the present invention taken along line 15—15 of Fig. 2.

Fig. 16 is an enlarged section taken on line 16—16 of Fig. 14 showing a pitting punch and motivating assembly therefor.

Figures 17, 18:
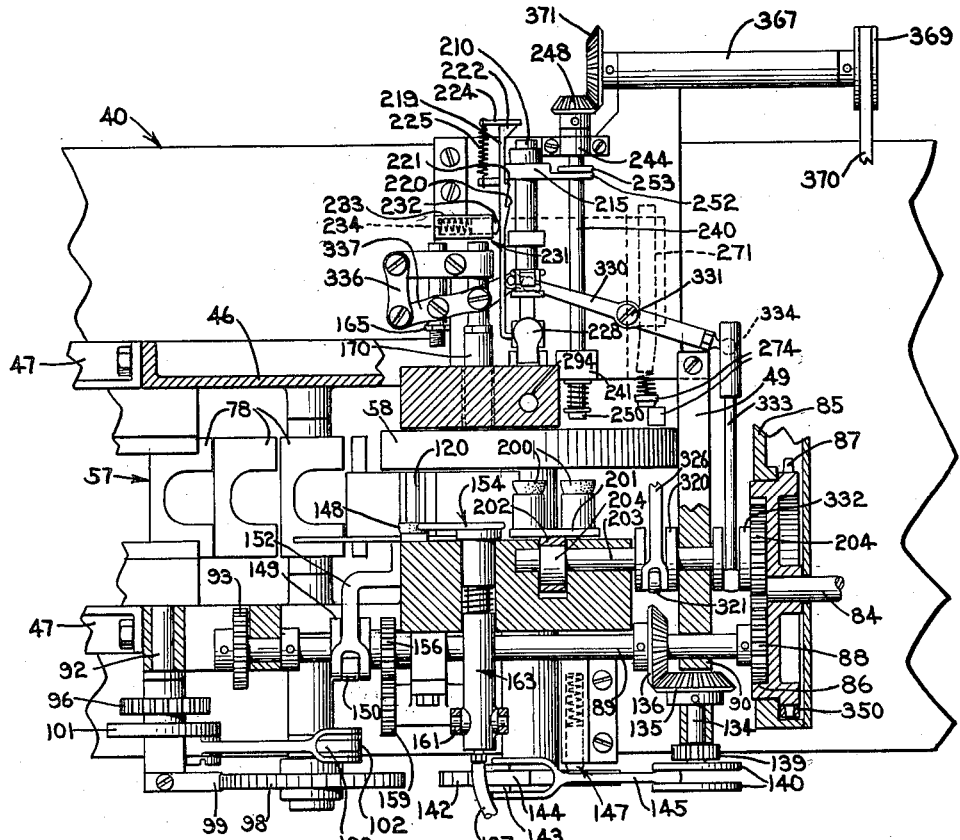

Fig. 17 is a fragmentary enlarged sectional view taken on line 17—17 of Fig. 1 showing in plan view, pitting, stuffing, and polishing stations.

Fig. 18 is an enlarged fragmentary section taken on line 18—18 of Fig. 2.

Fig. 19 is an enlarged fragmentary, horizontal, sectional view of the machine as taken on line 19—19 in Fig. 7 and showing in greater detail the pitting, stuffing, and polishing stations of Fig. 17.

Fig. 20 is a fragmentary portion of Fig. 19 showing elements employed at the stuffing station in a relation demonstrating the withdrawal of a stuffing tube from fruit engagement while simultaneously ejecting stuffing material into the fruit.

Fig. 21 is a fragmentary portion of Fig. 19 illustrating elements thereof in a succeeding operational position.

Fig. 22 is a fragmentary view of the mechanism shown in Fig. 19 placing particular emphasis on a fruit coring knife and fruit pit guide replacing the combined coring knife and guide of Figs. 15 and 19.

Fig. 23 is similar to Fig. 22 but with the coring knife and guide in an immediately subsequent operational position.

Fig. 24 is similar to Fig. 23 but with the coring knife and guide in an immediately succeeding operational position.

Fig. 25 is a section taken on line 25—25 of Fig. 22.

Fig. 26 is a section taken on line 26—26 of Fig. 22.

Fig. 27 is a section taken on line 27—27 of Fig. 22.

Fig. 28 is a fragmentary section taken on line 28—28 of Fig. 22.

Figure 29:
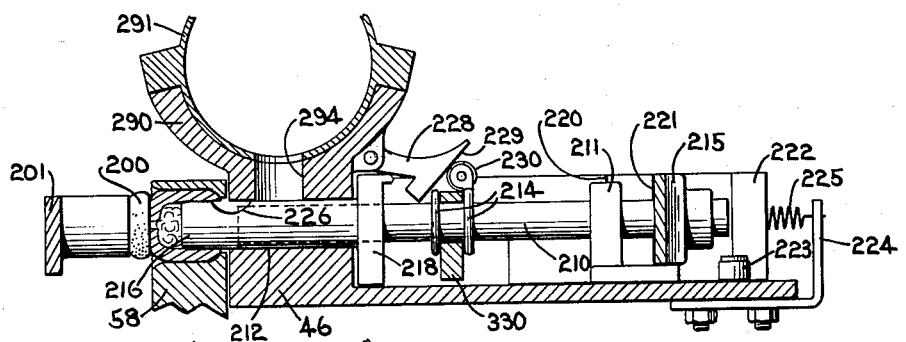

Fig. 29 is a sectional view of the stuffing tube and associated mechanism, as taken on line 29—29 of Fig. 19, showing the stuffing tube inserted into a fruit, the stuffing tube and an ejection piston being shown in their relative positions immediately prior to ejection of stuffing material into the fruit.

Figure 30:
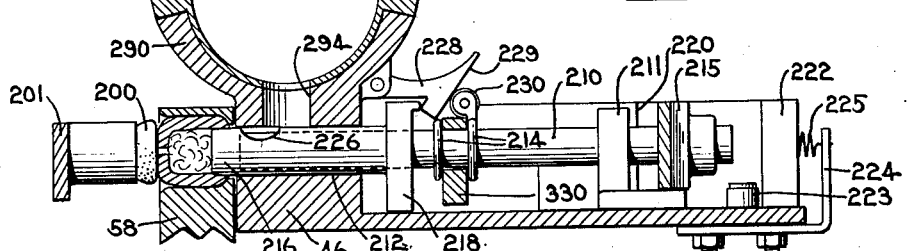

Fig. 30 shows the mechanism of Fig. 29 during retraction of the stuffing tube from fruit engagement and ejection of stuffing material into the fruit.

Figure 31:
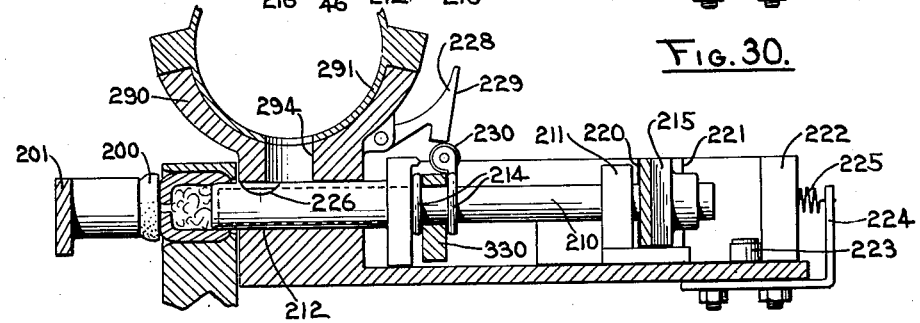

Fig. 31 shows the mechanism of Figs. 29 and 30 with the stuffing tube and ejection piston in substantial transverse end alignment preliminary to complete withdrawal from the fruit.

Figure 32:
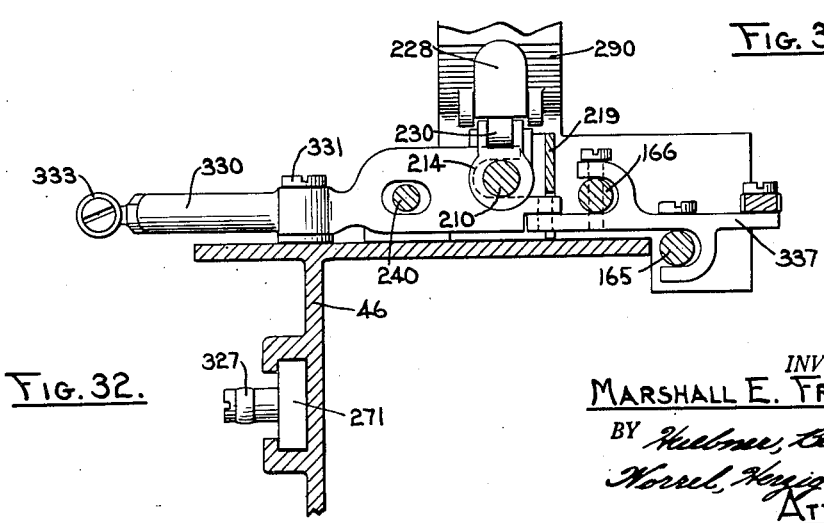

Fig. 32 is a sectional view taken on line 32—32 of Fig. 19 showing operational mechanism of the pitting, stuffing, and polishing stations.

Fig. 33 is an enlarged vertical sectional view taken on line 33—33 of Fig. 2.

Fig. 34 shows a stuffing, cutting and metering device, as taken on line 34—34 of Fig. 7.

Fig. 35 shows the elements of Fig. 34 in an immediately subsequent operational position.

Fig. 36 is a fragmentary section taken on line 36—36 of Fig. 33.

Figure 37:
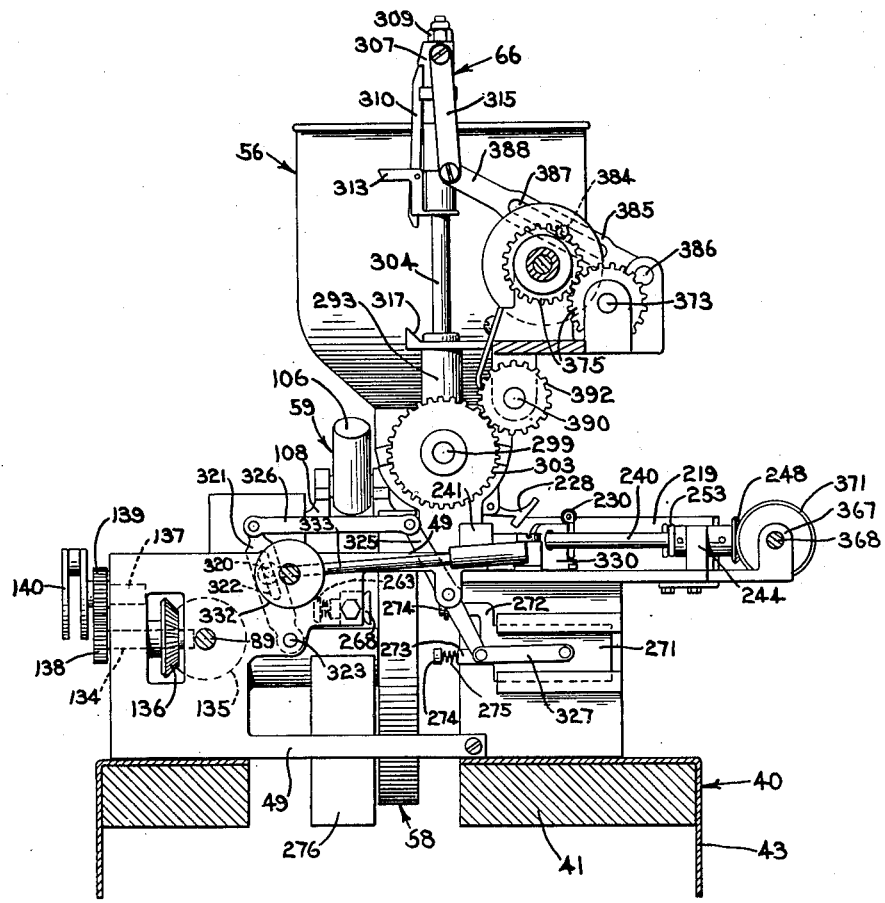

Fig. 37 is a vertical transverse offset section taken on line 37—37 of Fig. 1 looking in the direction opposite to that of Figs. 3, 13, and 14.

Referring in greater detail to the drawings, a substantially rectangular support frame 40 is employed which is conveniently formed from a rectangular plank 41, of wood or other suitable material, having a longitudinal slot formed inwardly from an end thereof and supported at four corners by legs 42. For convenience and as a measure of sanitation, a metallic hood 43 is fitted downwardly over the plank and is preferably formed from stainless steel or the like. As will subsequently be more clearly apparent, a forward support casting 45 and a rearward support casting 46 are mounted in parallel spaced relation longitudinally of the plank 41 intermediate the end portions thereof. A generally U-shaped angle iron member 47 is butt welded, or otherwise secured to the castings and horizontally extended therefrom endwardly of the plank about the slot, as shown in Fig. 2. Struts 48 and 49 as shown in Fig. 9 interconnect the forward and rearward support castings 45 and 46 in fixed spaced relation at the ends thereof to which the angle iron member is butt welded. It is to be understood that the present invention is not limited to the supporting means alluded to but may employ any other dependable support structure without departing from the spirit or the scope of the invention. Both of the forward and rearward support castings are actually assembled from a plurality of castings for assembly convenience as shown in the drawings. Inasmuch as no invention is claimed in the specific form of the support means for the operable structures, detailed description of the form and assembly of the individual components of the support castings is omitted in the interest of brevity.

The major elements and sub-assemblies of the deivce of the present invention supported on the frame 40 are evident in Figs. 1, 2, 3 and 7 and are generally identified at this point for convenience prior to a description of the details. A bin or hopper 55, adapted to receive olives or other fruit to be pitted in bulk, is mounted on the U-shaped angle iron member 47. The bin is preferably watertight so that liquid may be employed to make fruit deposited therein relatively buoyant and easy to gather and convey therefrom. A hopper 56 is provided at the top of the device to receive stuffing material, also in bulk, such as pimento, celery, nuts, anchovies, or other desired material. A conveyor 57 has one end located in the bin 55 and is inclined upwardly therefrom. A carrier 58, adapted to receive fruit and maintain the same in desired position during coring, pitting, stuffing, and polishing operations is mounted for rotational movement in a substantially erect plane longitudinally of the support frame on the forward support casting 45 adjacent to the upwardly extended end of the conveyor. Fruit is delivered upwardly from the bin on the conveyor and is transferred from the upper end thereof to a position adjacent to the carrier, for insertion therein, by a mechanical hand indicated generally at 59. The carrier has a plurality of fruit-receiving compartments formed axially therethrough in an annular arrangement concentrically of the carrier, said compartments having openings disposed toward the forward support casting of a size to receive the fruit to be processed and constricted openings at the opposite ends thereof disposed toward the rearward support casting. Stepped rotation of the carrier successively locates individual compartments at a loading station 60, a pitting station 61, a stuffing station 62, a polishing station 63, a loosening station 64, and an ejecting station 65. Intermediate the hopper 56 and the stuffing station 62 is a stuffing charge metering mechanism indicated generally at 66 through which stuffing material is fed, as will subsequently be described in greater detail.

Conveyor

The conveyor 57, shown in Figs. 2 and 7, employs a pathway 70 having a lower end portion within the bin 55 which is substantially horizontal, an upwardly inclined central portion, and a substantially horizontal upper end portion extended from the bin. Transverse corrugations 71 are provided in the pathway adjacent to the upper end portion. An axle 72 is journaled in the support casings 45 and 46 adjacent to the upper end of the pathway and transversely disposed thereto. A pair of spaced sprockets 73 are mounted on the axle, adjacent to the upper end of the pathway and in substantial alignment therewith. The axle 72 is rotated in stepped progression by a motivating means presently to be described. A pair of horizontally spaced, substantially parallel chains 75 are individually mounted about the sprockets for travel longitudinally of the pathway 70. At the lower end of the pathway, a substantially cylindrical member 76 is formed integrally with the pathway transversely thereof and slidably receives the chains for circuitous travel thereabout. The chains are sufficiently loose gravitationally to conform to the curved upper surfaces of the pathway 70 clearly evident in Figs. 1 and 7.

As shown in Fig. 4 generally U-shaped clips 77, of spring material and having reversely turned legs, are mounted between the chains for travel therewith over the pathway. A plurality of fruit engaging and motivating cups 78 are mounted for travel with the chains by insertion into the clips. The cups are preferably substantially rectangular and have a concave fruit engaging edge. The cups have no bottoms, for it is desired to roll the fruit over the pathway but do have a downwardly extending base 79 adapted releaseably to be grasped by the clips for retention in the conveyor. The cups are conveniently formed from plastic, ceramic, or other strong and readily cleaned material. The base portions of the cups are held by the reversely turned legs of the clips but may readily be removed therefrom for replacement by cups of other sizes or shapes in relation to the size and shape of fruit to be processed by springing the slips.

The axle 72, and other mechanism of the device, is conveniently driven by a motor 81 mounted at the end of the support frame 40 opposite to the bin 55. A reduction gear assembly 82, of any suitable form, has driven connection to the motor and in turn drives a clutch mechanism 83 which is adapted to slip upon jamming of any of the mechanism so as to avoid unnecessary damage thereto. The clutch has driven connection to a main drive shaft 84 rotatably mounted in a strut housing 85. As shown in Fig. 17, an internal gear 86 having peripherally extended sprocket teeth 87 is mounted on the drive shaft 84. A pinion 88 has driven mesh with the internal gear 86 and rotates a shaft 89 journaled in a strut 90 longitudinally of the device.

As shown in Fig. 18, an upper shaft 91 and a lower shaft 92 are journaled in the support casting 45 in substantially parallel relation to the axle 72 and adjacent to an end of the shaft 89. A pair of meshed spur gears 93 are mounted one on the shaft 89 and the other on a shaft 94, respectively, and translate rotary motion through a pair of meshed bevel gears 95 into responsive rotary motion of the upper shaft 91. A pair of meshed spur gears 96, one mounted on the upper shaft 91 and the other on the lower shaft 92 provide driven connection therebetween.

The axle 72 which mounts the sprockets 73 also mounts a sprag wheel 98 at the outer end thereof, as shown in Fig. 2. A detent 99 is mounted on the frame 40 in engagement with the sprag wheel 98 and limits rotation of said wheel to a direction driving the sprockets so as to travel the chains 75 upwardly of the pathway 70. A ratchet wheel 100 is mounted on the axle 72 adjacent to the sprag wheel. A wheel 101 is mounted on the outer end portion of the lower shaft 92, as shown in Figs. 1 and 2, in substantial alignment with the ratchet wheel 100. A ratchet pawl 102 is rotatably mounted on the outer face of the wheel 101 for reciprocal movement upon rotation of the lower shaft. The pawl engages the ratchet wheel 100 and rotates the axle 72 and its sprockets 73 in stepped rotational progression.

It will readily be apparent that the timing of the conveyance of fruit from the hopper may be synchronized with subsequent operations by manually turning the sprag wheel 98, clockwise as viewed in Fig. 1, to adjusted position. The spacing of the fruit engaging cups 78 in the chains 75 and the association of the wheel 101, pawl 102 and ratchet wheel 100 are such that each stepped rotation of the axle 72 precisely positions each successive fruit engaging cup in the position occupied by its respective preceding cup. Thus, each stepped rotation of the axle 72 by the pawl 102 delivers a fruit, as shown at 103 in Fig. 7, into precise predetermined position.

As the chains 75 and the cups 78 are dragged upwardly over the pathway 47, individual fruit is gravitated in the hopper into the cups and rolled upwardly over the pathway. By employing cups of appropriate fruit size and providing an abundance of fruit in the hopper, the loading of each cup is assured and inasmuch as there is room for only one fruit in each cup the fruit is conveyed individually in succession up the pathway, excessive fruit being shed from the pathway.

Oblong fruit such as olives, dates, and the like as they are rolled across the corrugations 71, automatically position themselves with their major axes transversely of the pathway. Thus, fruit is conveyed from the bin 55 in timed spaced relation and positioned for subsequent handling with their major axes, if any, transversely of the pathway in the position 103 occupied by the fruit, in Fig. 7.

*Mechanical hand*

It is desired to transfer in timed spaced relation fruit synchronously with its delivery at 103 from such position to the loading station 60. To this end the mechanical hand 59 is provided. The hand consists of an upper tubular member 106 mounted for pivotal movement in a substantially erect plane, as at 107 on a bracket 108 bolted, or otherwise secured to the support castings 45 and 46, as shown in Fig. 13. As evident in Fig. 9, an inner tubular member 109 is telescopically mounted in the lower end of the tubular member 106. The lower end of the member 109 is capped, as at 112 in Figs. 10 and 11, which cap is provided with a central bore. A pair of fingers 115 are endwardly extended from the member 109 and pivotally interconnected by a pin 116. The pin 116 is journaled in a mounting rod 117 which is extended through the bore in the cap and provided with an enlarged inner end. A spring 118 is located under initial compression between the cap and the inner end of the rod. The upper ends of the fingers are shaped to rock on the cap so that movement of the rod inwardly of the telescopic member 109 under urging of the spring 118 rocks the fingers relatively toward each other about their pin 116. Movement of the fingers away from each other is opposed by the spring by the rocking action of the upper ends of the fingers on the cap. The fingers are configurated slidably to receive fruit to be grasped thereby and transferred from the conveyor to the loading station.

A loading trough 120 is mounted on the support casting 45 in the plane of the pivotal movement of the telescopic tubular members 106 and 109 and in alignment with the loading station 60. A splash guard 121 and a drop collector 122 are formed integrally with the loading trough 120 and so positioned that any splashing against the guard 121 or moisture collected at 122 drains into the bin 55. For this purpose a drip pan 123 is extended from the bin under the conveyor to a position beneath the loading trough.

As shown in Figs. 1 and 9, a camway 125 is formed in the bracket 108 adjacent and below the pivotal mounting 107. The camway has an elevated central portion and relatively lower end portions. A cam follower 126 is extended from the inner member 109 and engaged with the camway. The camway is arranged so that through the association of the cam follower therewith the telescopic members are extended to engage a fruit, as shown in Figs. 7 and 9, contracted upon pivotal movement of said members to lift the fruit from the conveyor, and re-extended within the tubular member 106 to place the fruit on the loading trough 120.

An eccentric 130 is mounted on the inner end of the upper shaft 91 adjacent to the support casting 45 for unitary rotational movement with the shaft. A connecting arm 131 is interconnected with the eccentric 130 and the cam follower 126, as shown in Fig. 2 and translates rotary motion of said shaft into reciprocal pivotal movement of the telescopic members 106 and 109. Through manual rotation of the sprag wheel 98, as previously described the operation of the hand and conveyor are synchronized so that fruit is individually delivered to hand grasping position 103, Figs. 7 and 9, coincident with downward movement of the hand to grasp the same. The hand then, during its pivotal movement, raises the fruit thus grasped and moves it to the trough 120. The action of the spring 118 provides dependable grasping of the fruit. The pivotal movement of the fingers about the pin 116 and rotatable positioning of the rod 117 in the cap 112 permit automatic accommodation of the hand to fruit position even though slightly displaced from the usual position transversely of the conveyor.

*Carrier*

As previously described, the carrier 58 having a plurality of compartments annularly arranged concentrically thereof is journaled in the forward support casting 45, as at 113 shown in Figs. 1, 7, and 37. The carrier is supported for rotation in a substantially erect plane longitudinally of the frame 40 adjacent to the hand 59. A drive linkage is provided whereby the carrier is rotated in stepped progression successively positioning the individual compartments at the loading station 60, pitting station 61, stuffing station 62, polishing station 63, loosening station 64, and ejecting station 65. This linkage comprises a stub shaft 134 journaled in the forward casting 45, as shown in Fig. 37, which mounts a bevel gear 135 in mesh with a bevel gear 136 mounted on the main shaft 89. This arrangement is also evident in Fig. 2. A second stub shaft 137 is journaled in the forward casting above the shaft 134 and driven connection made therewith by the stub shaft 134 through a pair of spur gears 138 and 139. A crank member 140 is mounted on the second stub shaft 137 for rotation therewith. A ratchet wheel 142 is mounted for unitary rotational movement with the carrier 58 in substantial alignment with the crank member 140. A radius arm 143 is pivotally mounted concentrically of the ratchet wheel and in turn bears a dog 144 for engagement with the ratchet wheel. A drive arm 145 interconnects the crank member and the radius rod for responsive reciprocal movement whereby the ratchet wheel is rotated in stepped progression successively to bring the compartments in the carrier to stations described. In order to resist displacement of the carrier from the proper progressively stepped positions, a series of annularly arranged pockets 146 are provided in the ratchet wheel 142. A spring loaded detent shown generally at 147 is mounted on the forward casting 45 for engagement in the pockets 146. The engaging end of the detent 147 is rounded and in association with the pockets 146 resists inadvertent displacement of the carrier from appropriate stepped positions but readily accommodates positive stepped rotation thereof.

A loading plunger 148 is mounted in the forward support casting 45 for longitudinal reciprocal movement in alignment with the trough 120, as shown in Figs. 2 and 12. To drive the loading plunger, an eccentric 149 is provided in the shaft 89. A slotted arm 150 is pivotally mounted on the forward support casting as at 151 and slideably receives the eccentric 149 and is upwardly extended therefrom. A driving bracket 152 is connected to the loading plunger 148 and to the upwardly extended end of the arm 150. As the shaft 89 is rotated the loading plunger is longitudinally reciprocated in timed relation to the movement of a fruit by the mechanical hand 59 to the trough 120 whereby the fruit is shoved from the hand into the compartment in the carrier 58 concurrently located at the loading station 60.

Coring and pitting

It takes two steps of the rotational movement of the carrier to transfer fruit from the loading station to the pitting station 61. Leaving between the loading and pitting station a blank station 153 whose function will soon become apparent. To hold fruit in the carrier in the blank station and the pitting station, a retaining member 154 is juxtapositioned the compartment positions in said stations and mounted for reciprocal movement in the forward support casting from a position closely adjacent to the carrier and overlaying the compartments, and a position retracted therefrom. This structure is evident in Figs. 2, 14, 17, 19, and 21. To reciprocally position the retaining member in proper timed relation and extent of movement, a stub shaft 155 is journaled in the forward support casting as shown in Fig. 18 below and substantially parallel to the shaft 90 and a pair of spur gears 156 provide driven connection between the shaft 89 and stub shaft 155. This is evident in Fig. 14. A wheel 157 bearing an eccentric 158 is rotatably mounted in the forward support casting adjacent to the spur gears 156 and a spur gear 159 is mounted concentrically on the wheel 157 in mesh with the lower of the pair of spur gears 156. A driving arm 161 is pivotally mounted, as by a toggle 162, above the eccentric 158 and is pivotally reciprocated by slideable association with the eccentric. The retaining member 154 has a mounting portion 163 extended through the forward support casting and pivotally connected to the driving arm 161 intermediate the toggle 162 and the eccentric 158.

A pair of shank members 165 and 166 having screw-threaded end portions are slidably mounted on the rearward support casting 46, as at 167 and 168, substantially in endward alignment with the blank station 153 and the loading station 60 respectively and juxtapositioned the retaining member 154. The shank members are arranged on the opposite side of the carrier 58 from the retaining member and are longitudinally reciprocated in timed relation to the positioning of a compartment at their respective stations in a manner which will subsequently be described in connection with other drive mechanisms. A substantially cylindrical hollow knife 170 of steel, or other springlike material, is screw-threadedly engaged to the shank member 166 for unitary reciprocation therewith to and from the compartments in the carrier located at the pitting station as demonstrated in Figs. 19 and 21. So as to be sufficiently expansible to receive fruit pits therethrough, the knife is slotted, as at 171, from its extended end portion, which is sharpened, longitudinally and partially circumferentially in a segment of a helix of accelerated pitch. To assist in guiding the knife to and from the successive compartments located at the pitting station, the support casting 46 is upwardly extended between the shank member 166 and the carrier and a guide opening provided therethrough slidably receiving the knife. A radial opening 172 is provided downwardly disposed in the coring knife 170 of a size to emit pits removed from the fruit. A concave pit guide 173 is provided in the coring knife to guide pits thrust inwardly from the end of the knife out the opening 172, as shown in Fig. 14. The length of the coring knife and the distance of reciprocation of the shank member 166 is such that olives, or other fruit positioned in the compartment at the pitting station, are cut by movement of the coring knife into the compartment to a sufficient extent partially to receive the pit for ejection therethrough. The coring knife 170 is thrust into the fruit at the pitting station subsequent to the positioning of the retaining member 154 closely adjacent to the carrier to maintain the fruit in the compartments during the coring operation.

It will be obvious that the retaining member 154 is preferably slightly resilient to avoid chipping pits by accidental striking thereof by the knife. This resilience is achieved as shown in Fig. 16. The retaining member 154 comprises a fruit contacting face plate 174 borne by the mounting portion 163 which is slidably mounted for longitudinal reciprocal movement in the forward support casting 45. The support portion comprises a sleeve 175 formed integrally with the face plate 174 slidably mounted on a cylindrical base 176 providing a circumscribing shoulder 177 in spaced relation to the end of the sleeve. A compression spring 178 is mounted circumjacent the base intermediate the shoulder and the sleeve. A punch bore 179 is formed longitudinally through the base and the face plate. A counter-bore 181 is formed in the base concentrically with the punch bore at the opposite end of the base from the face plate. A retraction compression spring 182 is mounted in the counter-bore. A pitting punch 183 formed integrally with a piston 184 is inserted through the spring and is slidably mounted in the punch bore, the piston being slidably received in the counter-bore in abutting relation to the retraction spring. A bushing 185 is screw-threadably engaged in the end of the counter-bore and provides a port 186 therethrough. The port is connected by a conduit 187 with a valve 188 mounted on the forward support casting 45 adjacent to the driving arm 161 as indicated in Fig. 15. The valve 188 has a control plunger 189 arranged so that it is forced inwardly of the valve by the driving arm 161 when the retaining member 154 is at its extreme inwardly driven position adjacent to the carrier 58. The valve may take any convenient form. There being several conventional forms suitable to the purpose the structure thereof is not described at this point in further detail. The valve is connected by a pressure supply line 191 to any convenient source of fluid pressure, not shown. In operation, the insertion of the plunger 189 into the valve by the driving arm 161 opens the conduit 187 to the high pressure line 191 and the piston 184 is driven to the left, as viewed in Fig. 16, driving the punch 183 into the fruit positioned at the pitting station, as shown in Fig. 21, and ejecting the pit through the coring knife 170. When the driving arm 161 disengages the plunger 189, the plunger returns to normal position under the urging of a spring within the valve, shutting off the pressure supply line 191 and bleeding the conduit 187 and counter-bore 181 to atmospheric pressure, in which condition the retraction spring 182 retracts the pitting punch from fruit engagement.

It will be obvious that the pitting punch may be mechanically or otherwise motivated without departing from the spirit or the scope of the present invention. It will be seen, that upon location of a fruit at the pitting station 61, the following occurs in sequence: First, the retaining member 154 is moved closely adjacent to the carrier 58 to retain the fruit therein; second, the coring knife 170 is driven into the fruit partially to receive the pit; third, the punch 183 is driven into the fruit engaging the pit and forcing the same into the knife and out the opening 172; fourth, the pitting punch is withdrawn from the fruit; and fifth, the coring knife 170 is withdrawn from the fruit and the carrier. Subsequently the carrier is rotated one step bringing the fruit thus pitted and cored to the stuffing station 62.

*Modified coring and pitting*

In the pitting of certain fruits, such as small olives of the petite, standard, and medium sizes, the ejection of the pits thereof through the coring knife is objectionable in that the opening formed in the fruit from an end thereof is of such size to make the fruit appear undesirably short and stubby after pitting. A modified coring and pitting is thus provided for such fruits, as demonstrated in Figs. 22 to 28, inclusively.

For the modified coring and pitting operation, a coring knife 192 is mounted on the shank 165 at the so-called blank station 153 for longitudinal sliding movement to and from fruit positioned at said station. The coring knife is preferably of the form described for knife 170 although the pits are not ejected therethrough in the modified coring and pitting. The coring knife 192 is of a diameter less than the diameter of the pits to be ejected from the fruit so as to minimize the size of the opening formed in the fruit. As previously described, the shank member 165 is longitudinally reciprocated synchronously with the stepped rotation of the carrier 58 so that as a fruit is located at the station 153, the knife 192 is driven into the end of the fruit substantially to the pit and retracted from the fruit prior to the next stepped rotation of the carrier. The cored material which remains in the knife upon retraction, is subsequently urged through the opening in the bottom of the knife by subsequent coring operations but pits are not ejected through the knife at the station 153.

The succeeding stepped rotation of the carrier conveys the fruit cored at 153 to the pitting station 61. The coring knife 170 previously borne by the shank member 166 is removed and a guide member 193 screw threadably mounted on the shank in place of said knife. The guide member comprises a stud 194 screw threadedly mounted on the shank member in alignment between said shank and the pitting station. A hollow cylindrical element 195 having a closed end portion 196 is mounted on the stud for telescopic movement relative thereto and slidably received in the opening in the rearward support casting 46 through which the knife 170 is reciprocally positioned in the previously described pitting operations. A pin 197 is extended radially through the stud and engaged in a slot 198 in the cylindrical element 195 to lock the stud and said element in assembled relation and to accommodate telescopic movement. A compression spring 199 is mounted in the hollow cylindrical element between the end of the stud and the closed end 196 of said element. Externally, the closed end 196 is provided with a cavity adapted to receive the end of a pit ejected from the fruit.

First the fruit is positioned at the station 153, as shown in Fig. 22, the coring knife 192, and the guide member 193 being in retracted position. In such station the coring knife is driven into the fruit as shown in Fig. 23. As a fruit is cored at the station 153 a previously cored fruit at the pitting station 61 is pitted by the operation of the punch 183 in the manner previously described except in this instance the pit instead of being ejected through the coring knife is ejected into the cavity at the closed end 196 of the guide member. The resilience of the spring 199 permits the element 195 to retract under the urging of the punch 183 against the pit. The cavity serves to guide the pit so that it moves endwardly through the cored opening. As shown, this modified coring and pitting operation permits the ejection of a pit through an opening of a diameter less than the pit because of the elasticity of the fruit. Once the pit is ejected, the coring opening returns substantially to its initial size. As shown in Fig. 26, the pit falls from the guide member 193 upon retraction of the punch. Upon retraction of the punch, the coring knife 192 is withdrawn from the carrier, as shown in Fig. 25, and the carrier subsequently rotated to bring the cored and pitted fruit to the stuffing station 62. Figs. 27 and 28 taken on lines 27—27 and 28—28, respectively, of Fig. 22 demonstrate the relative positions of the coring knife and the guide member at their stations.

*Stuffing mechanism*

It is also desirable to provide retaining means for the fruit at the stuffing and polishing stations 62 and 63, respectively. For this purpose a pair of fruit retaining cups 200 are mounted in unitary relation as shown in Figs. 17, 19, and 21, in the forward support casting 45 for reciprocal movement to and from the carrier 58. This is accomplished by mounting the cups on a slide member 201 received by said support casting. As shown in Fig. 15 the slide member 201 provides a cam cage 202 within the support casting. A shaft 203 in journaled longitudinally in the support casting as shown in Fig. 17 and mounts a spur gear 204 in driven mesh with the internal gear 86. The shaft 203 provides an eccentric cam 204 rotatably received by the cam cage 202 and from the rotation of which the cups 200 are positioned intimately adjacent to the carrier when the same is stopped with compartments in the pitting and the stuffing stations and retracted from said position for stepped rotation of the carrier.

The stuffing of fruit at the station 62 is most clearly demonstrated in Figs. 19, 20, 21, 29, 30, and 31. A piston member 210 is mounted on the rearward support casting 46 as at 211 for longitudinal reciprocal movement in alignment with a stuffing tube guide opening 212 formed in said support casting in alignment with the stuffing station 62. A pair of longitudinally spaced annular collars 214 are provided on the piston between which a drive mechanism engages the piston for driven longitudinal reciprocation thereof, presently more fully described. Rearward of the slide mounting 211 a ratchet collar 215 is fixedly mounted on the piston.

A stuffing tube 216 is slidably mounted over the piston 210 and positioned in the opening 212 for reciprocation to and from compartments located in juxtaposition thereto. The stuffing tube has a sharpened extended end portion 217 and an annular flange 218 radially extended from its opposite end. A ratchet rack 219 having a pair of teeth 220 and 221, respectively, is mounted on the tube 216 by the flange 218 and is extended rearwardly therefrom in resilient substantially parallel relation to the piston 210 for engagement of the teeth with the ratchet collar 215. At the rearwardly extended end of the ratchet rack is provided a wedge shaped cam 222 mounted for engagement with a cylindrical post 223 upwardly extended from the support casting 46. A stop 224 is rigidly mounted on said casting in substantial alignment with the ratchet rack as a limit to rearward motion thereof. A tension spring 225 interconnects the ratchet rack and the stop.

The drive mechanism having driven connection with the piston between the collars 214 retracts the piston 210 and the stuffing tube 216 from the carrier as shown in Fig. 34. In such position a stuffing receiving opening 226 formed radially through the stuffing tube is in registration with a source of stuffing material under pressure which is forced into the tube as shown in Fig. 35 by a mechanism presently described. It is to be noted that the stuffing tube is in endwardly extended position relative to the piston 210 during such loading operation and the stuffing material injected into the tube adjacent to the end of the piston.

When a charge of stuffing material has been positioned in the stuffing tube the piston is moved forwardly into a fruit at the stuffing station 62 as shown in Figs. 19 and 29. During such movement of the piston toward the compartment at the stuffing station, the tooth 221 on the ratchet rack 219 engages the ratchet collar 215 and movement of the piston is transmitted through the ratchet rack to corresponding movement of the stuffing tube. When the stuffing tube has entered the fruit, the wedge shaped cam 222 is brought to bear against the post 223 and the ratchet rack urged outwardly from the collar 215 to disengage the tooth 221 therefrom, the spring 225 through its action on the ratchet rack urges the stuffing tube rearwardly relative to the piston as the piston is continued inwardly of the fruit. This has the effect of ejecting stuffing material from the tube into the fruit.

As shown in Figs. 29, 30, and 31, a catch 228 is pivotally mounted above the stuffing tube 216 and piston 210 for gravitational latching engagement with the flange 218. The flange and catch are so arranged that when the tooth 221 is released from the ratchet collar 215 the rearward movement of the stuffing tube relative to the piston is insufficient to remove the tube from fruit engagement and is short of transverse end alignment with the piston. This holding of the tube relative to the piston by the catch is demonstrated in Fig. 30.

The underside of the catch is provided with a sloping camway 229 downwardly inclined toward the forward part of the machine. A roller 230 is mounted on the rearwardmost of the collars 214 for engagement with the camway 229 and upon further travel of the piston 210 toward the carrier, the roller 230 elevates the catch 229 and disengages the same from the flange 218. When the catch is disengaged from the flange, the spring 225 draws the tube further rearwardly on the piston, as indicated in Figs. 21 and 31, in which condition the stuffing tube and piston are in substantial transverse end alignment. The ratchet tooth 220 engages the ratchet collar 215 and limits further retraction of the tube relative to the piston. The travel of the piston is such that it slightly enters the cavity in the previously pitted fruit and the movement of the stuffing tube rearwardly thereon is such that their reaching of substantial transverse end alignment is achieved concurrently with the maximum insertion of the piston into the fruit. This movement of the piston not only empties the stuffing tube of the stuffing material but serves to compact the same into the fruit.

Subsequently, the piston 210 and the stuffing tube in substantially transverse end alignment therewith are retracted from the compartment located at the stuffing station and the carrier is freed to rotate through its next step, bringing the stuffed fruit to the polishing station 63. On continued rearward movement of the piston, the rearward end of the ratchet rack 219 strikes the stop 224. Continued rearward motion of the piston withdraws the piston within the stuffing tube substantially to the position shown in Figs. 19 and 29, wherein the stuffing tube and piston are locked in relative stuffing-receiving relation by engagement of the tooth 201 with the ratchet collar 215.

A resilient glide member 231 (Fig. 17) is borne by the rearward support casting 46 in engagement with the ratchet rack 219 to urge the same into ratchet collar engagement. The glide member comprises a piston 232 slidably mounted in a cylinder 233 normal to the rack and urged theretoward by a spring 234. Obviously the wedging effect of the cam 222 in association with the post 223 is sufficient to overcome the force exerted on the ratchet rack by the spring 234 to disengage said rack from the ratchet collar, as previously described.

*Polishing*

As illustrated in Figs. 17, 19, 21, and 37, a polishing shaft 240 is rotatably mounted on the rearward support casting 46 in a bearing 241 for rotational and longitudinally slidable movement. The polishing shaft is longitudinally aligned with the polishing station 63. The rearward end portion of the polishing shaft is longitudinally slotted as at 242. The slotted end of the shaft is slidably fitted internally of a sleeve 243 which is in turn journaled in a bearing 244 mounted on the rearward support casting. The sleeve mounts thrust collars 245 and 246 on opposite sides of the bearing 244 so that the sleeve is rotatably mounted in fixed longitudinal relation therein. A driving pin 247 is extended diametrically through the sleeve and slidably received in the slotted portion 242 of the shaft whereby rotational movement of the sleeve is transmitted to the shaft and the shaft freed to move longitudinally relative thereto. The rearward end portion of the sleeve mounts a bevel gear 248 by which the sleeve and shaft are rotated, as will presently be more fully described.

The forward end of the polishing shaft 240 mounts a buffer 250 having a portion of reduced diameter to fit within the cored opening in fruit positioned at the polishing station to engage the stuffing and having a radially extended portion of a diameter greater than that of the shaft. A spring 251 is mounted under initial compression between the buffer and the bearing 241 and serves to urge the buffer into polishing engagement with the stuffing in the fruit. The relationship of the driving pin 247 and the slot 242 is such as to limit forward movement of the drive shaft excessively under the urging of the spring 251 and to limit the same to desired stuffing engagement. A bracket 252 is laterally extended from the ratchet collar 215 of the stuffing mechanism and slidably circumscribes the polishing shaft 240. A collar 253 is rigidly mounted on the polishing shaft rearward of the bracket in a position engageable by the bracket upon rearward motion of the ratchet collar whereby the polishing shaft is drawn rearwardly against urging of the spring, as shown in Figs. 17 and 37, removing the buffer from the polishing compartment and telescoping within the sleeve 243. On forward movement of the ratchet collar 215 and its bracket 252, the shaft moves forwardly therewith under urging of the spring 251 until it reaches its polishing position as determined by the pin and slot arrangement previously described. It will be apparent that the polisher is moved under the urging of the spring into the polishing station only momentarily while the carrier is stopped for the previously described loading, coring, pitting, and stuffing. Subsequent to retraction of the polishing shaft, the carrier 58 is motivated in a succeeding step bringing the pitted, stuffed, and polished fruit into the loosening station 64.

Loosening and ejecting

The preceding operations, because of endward pressures applied to the fruit, serve to decrease the major axes thereof and to increase the minor axes so that the fruit are somewhat tightly compacted in their respective compartments. It thus has been found advantageous to provide a preliminary loosening of the fruit prior to their ejection from the machine.

At the loosening station 64 a bracket 260 is rigidly mounted on the forward support casting 45 as a 261 in Fig. 19. A tubular member 262 is slidably mounted in the bracket in longitudinal alignment with the loosening station. The tubular member has stop flanges 263 radially extended from the opposite ends thereof on opposite sides of the bracket. For assembly convenience, one of the flanges is formed integrally with the tubular member and the other screw-threadedly mounted thereon. The flanges limit slidable movement of the tubular member. A spring 264 is located under initial compression between the bracket and the forwardmost of the flanges 263.

The tubular member has a central constriction 265 having a longitudinal bore therethrough. A rod 266 is slidably mounted in the bore and has a head 267 which in association with the constriction limits movement of the rod toward the carrier. A fruit cup 268 is mounted on the end of the rod extended toward the carrier for fruit engagement. A spring 269 is provided under initial compression between the constriction and the cup end of the rod. The spring 264 urges the tubular member 262 into retracted position. The spring 269 provides resilient fruit engagement.

Periodically, with the locating of a compartment at the loosening station 64, a driving mechanism urges the sleeve toward the carrier with the cup assuming a position closely adjacent to said carrier.

A fruit pushing member 271 is slidably mounted in the rearward support casting 46 for longitudinally slidable movement, as shown in Fig. 37. The pushing member has a pair of legs, one thereof juxtapositioned the loosening station, as shown at 272, and the other juxtapositioned the ejecting station 65, as shown at 273. Each of the terminal ends of the legs 272 and 273 mounts a bumper 274 for fruit engagement in its respective station. The bumper on the ejecting leg is extended closer to the carrier than the loosening leg for passage substantially through a compartment located at the ejecting station and is mounted on a shock-absorbing spring 275 in order to obviate damage to the fruit while ejecting the same from the carrier. The bifurcated pushing member 271 is reciprocated by a drive linkage presently to be described in timed relation to movement of fruit-bearing compartments into the loosening and ejecting stations whereby the bumper of the loosening leg 272 engages fruit in its station and urges the same forwardly from said compartment against the resistance of the spring loaded cup 268. Simultaneously, the bumper on the ejecting leg 273 passes into its respective station and urges fruit from the compartment so located forwardly where it gravitates into a fruit-receiving chute 276. After the fruit has been loosened at the station 64 and ejected from the station 65, the pushing member 271 and the cup 268 under the urging of the spring 264 are retracted from the carrier permitting continued stepped rotation thereof.

Stuffing charge cutting

As shown in Figs. 2 and 13 and 33 a helical feed screw 280 is mounted for rotation in a substantially horizontal position at the bottom of the stuffing receiving hopper 56. The feed screw is preferably positioned in a concentrically arranged feeding tube 281 having an upper portion open to the bottom of the hopper. The feed screw has an axially extended shaft 282 journaled in a cap 283 screw threadedly mounted in closing relation to an end of the tube. A thrust collar 284 is mounted on the shaft externally of the cap which in association with the helical screw against the inside of the cap, locks said screw against longitudinal movement relative thereto. A serrated clutch plate 285 is mounted against the outer face of the thrust collar 284 and fixedly on the shaft 282. A sprocket 286 is journaled on the shaft and has a clutch plate 287 formed thereon mounted for engagement with the clutch plate 285. As shown, the clutch plates have complementarily shaped teeth of general ratchet form. A knurled hand wheel 288 is pinned to the shaft 282 adjacent to the sprocket and a spring located under initial compression between the wheel and the sprocket urging the clutch plates into engagement. As presently described, the sprocket is power driven and through engagement between the clutches drives the feed screw rearwardly at the top and forwardly at the bottom, as viewed in Fig. 33, counter-clockwise as viewed in Figs. 3 and 13. When the feed screw urges stuffing material from the hopper 56 more slowly than desired, the knurled wheel is manually turned in said feeding direction of rotation to advance increased amounts of the stuffing material more rapidly than rotation of the sprocket achieves. During such manual adjustment, the ratchet teeth permits the rotation of the shaft 282 independent of the sprocket, which with its clutch plate 287 moves against the urging of the spring 289 permitting clutch slipping.

The feeding tube 281 and the feed screw 280 terminate in substantial transverse end alignment opposite the cap 283. The stuffing charge metering chamber 66 is arranged concentrically of the feeding tube 281. The charge cutting chamber comprises an upwardly disposed concave portion 290 formed in the rearward support casting 46 adjacent and above the stuffing tube guide opening 212 as evident in Figs. 34, 35, and 36. A complementary downwardly disposed concave member 291 is screw-threadably mounted on the concave portion 290, as at 292. The portion 290 and the member 291 constitute a cylindrical housing in axial alignment with the feeding tube 281, longitudinally spaced from said tube, as evident in Fig. 33. The guide body 293 is upwardly extended from the member 291 and a guide bore 294 formed substantially vertically through the guide body, the concave member 291, and into the rearward support casting 46 to register with the stuffing tube guide opening 212. The bore is diametrically related to the housing 290—291 and normal to the longitudinal axis thereof. A hollow cylinder 295 is rotatably mounted in the housing 290—291 adjacent to the tube 281, radially extended and fitted to the opening between the housing and the tube, and journaled on the periphery of the tube, as shown in Fig. 33. The cylinder 295 provides a cylindrical inner surface continuous with the tube 281. A peripheral spur gear 296 is formed on the cylinder 295. The cylinder terminates short of the guide bore 294.

The end of the housing 290—291 opposite to the feed tube 281, is closed by a cap 297 screw-threadedly engaged thereto. A hub 298 having a bearing opening formed therethrough concentrically of the housing 290—291 is provided in the cap. A shaft 299 is journaled in the bearing of the hub 298 and a cup shaped rotor 300 mounted on the inner end thereof. The cup shaped rotor has radially inwardly extending paddles 301 within the housing. The rotor is journaled in the housing and is of substantially the same inner diameter as the cylinder 295. A thrust washer 302 is mounted on the shaft 299 externally of the cap 297 and serves to hold the cup rotor in position. A spur gear 303 is pinned to the shaft 299.

Rotation of the feed screw 280 serves to move stuffing material descending into the feeding tube 281 from the hopper 56 and to compact the same in the charge metering chamber 66. Not only does the feed screw serve to achieve this compacting but tends to rotate the stuffing material in the chamber. As subsequently described, the spur gears 296 and 303 are correspondingly rotated and serve to rotate the cylinder 295 and the cup shaped rotor 300 in unitary relation. This rotation serves to continue and augment the rotation by the feed screw of the stuffing material in the chamber 66 during cutting operations. The rotor 300 and the cylinder 295 are axially spaced on opposite sides of the bore 294 for freedom of the movement of a charge cutting mechanism therebetween.

A hollow-substantially cylindrical charge cutting knife 304 is mounted on the guide bore 294 for longitudinal, reciprocal movement through the chamber 66. A loading plunger 305 is slidably received in the charge cutting knife. The plunger is extended upwardly from the knife and is provided with a screw-threaded upper end portion. A sleeve 306 is fitted over the upper end portion of the knife and secured thereto. An outer sleeve 307, having a closed upper end portion with a central bore, is slidably received over the upper end portion of the sleeve 306. A compression spring 308 is interposed the closed end of the outer sleeve and the upper ends of the inner sleeve 306 and the knife 304, urging the outer sleeve and the knife and its sleeve 304 in telescopic extension. A nut 309 is screw-threadedly engaged to the upper end of the plunger 305 and adjustably limits telescopic extension of the outer sleeve 307 relative to the inner sleeve 306 and thus the lower end of the cutting knife 304 relative to the plunger 305. It will be apparent that telescopic adjustment of the sleeves 306 and 307 by the nut 309 against the compression spring 308 delimits the extension of the cutting knife beyond the lower end of the plunger and thus the quantity of stuffing material that is cut by passage of the knife and plunger downwardly through the chamber.

A rocker arm 310 is pivotally mounted intermediate its end portions on the sleeve 306, as at 311. A catch 312 engageable by the upper end of the rocker arm 310 is formed integrally with the outer sleeve 307. A bracket 313 is outwardly extended from the mounting of the rocker arm 311 and a spring 314 under initial compression located between the outer end of the bracket and the rocker arm at a position above its pivotal mounting to urge the upper end of said arm into engagement with the catch 312, as shown in Figs. 34 and 35. The rocker arm being mounted on the inner sleeve 306 and thus on the cutting knife 304, locks the plunger 305 in adjusted position relative to the knife 304 as determined by the nut 309 when engaged with the catch 312.

A pair of links 315 is connected to the upper end of the outer sleeve 307 and when motivated by the drive mechanism presently described, vertically reciprocates the plunger 305 and thus the cutting knife 304 through the chamber 66.

A cam member 317 is fixedly mounted on the upper end of the guide body 293 in a position engageable with the lower end of the rocker arm 310. As shown in Figs. 34 and 35 the cam member has an upwardly disposed surface outwardly and upwardly extended from the guide body. The lower end of the rocker arm has a downwardly and radially inwardly slanted lower end portion complementary to the cam chamber.

As the links 315 draw the outer sleeve 307 and the plunger 305 downwardly, the plunger, and the knife 304 endwardly extended therefrom, is urged through the chamber 66 and the downwardly disposed cavity defined by the lower end of the knife and the plunger cuts a charge of stuffing material from the material compacted into the chamber by the feed screw 280. The volume of the cavity is determined by the adjustment of the nut 309 and may be varied as desired. The engagement of the upper end of the rocker arm 310 with the catch 312 locks the plunger and knife in longitudinal relationship during the downward stroke thereof. When the knife reaches the stuffing receiving opening 226 in the stuffing tube 216, the lower end of the rocker arm 310 strikes the cam chamber 317 and the arm is pivoted from engagement with the shoulder 312. Further, the abutting of the lower end of the rocker arm with the cam chamber precludes further descent of the knife short of entrance into the stuffing tube 216. This condition is demonstrated in Fig. 35. As will presently become apparent, the links 315 continue drawing the outer sleeve 307 and thus the plunger 305 downwardly until the lower end of the plunger is in substantial transverse end alignment with the knife and the accumulated charge of stuffing material contained in the knife is ejected through the opening 226 into the stuffing tube 216 ahead of the piston 210.

On the return stroke of the links 315, the spring 308 maintains the knife 304 in its downwardly extended position until the plunger 305 has retracted sufficiently to withdraw the rocker arm 310 from engagement with the cam member 311 in which condition the spring 314 urges the upper end of the rocker arm into engagement with the catch 312. The knife and plunger subsequently travel upwardly together to the position shown in Fig. 34, retracted from the chamber 66, as the piston 210 urges the charge delivered to the tube 216 into a previously pitted fruit at the stuffing station 62. Successive reciprocation of the knife and plunger is synchronous with reciprocation of the stuffing tube 216 and piston 210.

As previously described the rotation of the cylinder 295 and of the rotor 300, rotates stuffing material compacted into the chamber 66 so that on successive strokes of the charge cutting knife 302 through the chamber 66, the stuffing material has been rotated and further compacted by the feed screw 280 delivering additional stuffing material thereto, to assure a full charge, as adjustably determined by the nut 309.

It will be apparent that to initiate the stuffing operation it is necessary to have an adequate preliminary supply of stuffing material compacted in the chamber 66. This is normally accomplished by manual rotation of the knurled wheel 288 preliminary to starting the motor 81 and thus prior to the first stroke of the charge cutting knife 302 through the chamber.

*Drive mechanism*

The means for motivating the conveyor 57, the sprockets 73 and the carrier 58 in stepped progression, the pivotal movement of the hand 59, the loading plunger 148, the retaining member 154, the pitting punch 183, and the retaining cup 200 have been described and are not reviewed at this time.

To reciprocate the bifurcated fruit pushing member 271 in the manner described, an eccentric 320 is provided in the shaft 203 as shown in Figs. 17 and 37. An arm 321 having a longitudinal slot 322 in slidable engagement with the eccentric, is pivotally mounted as at 323 in the forward support casting 45 and upwardly extended therefrom. A rocker arm 325 is pivotally mounted intermediate its end portions erectly in the rearward support casting 46 for pivotal movement in a plane common to the arm 321, transversely of the apparatus. The upwardly extended end portion of the rocker arm 325 is connected to the upwardly extended end portion of the arm 321 by a push-pull rod 326. A connecting rod 327 is pivotally interconnected with the fruit pushing member 271 and the downwardly extended end portion of the rocker arm 325. Upon rotation of the shaft 203 the eccentric 320 pivotally reciprocates the arm 321 which through the push-pull rod 326, the rocker arm 325, and the connecting rod 327 reciprocates the pushing member 271 to move the loosening leg 272 into the loosening station 64 and the ejecting leg 273 into the ejecting station 65 while the carrier is momentarily stopped with compartments in said station.

As previously described, and as evident in Figs. 20 and 37, the cup 268 is urged into relatively retracted position by the spring 264. As the arm 321 is pivotally reciprocated it periodically strikes the outermost of the flanges 263 and resiliently urges the cup 268 toward the carrier 58. This operation is synchronous with the locating of a compartment of the carrier in the loosening station for the loosening of fruit by the loosening leg 272. As shown in Fig. 37, when the arm 321 moves pivotally away from the carrier, the flange 263 motivating the cup 268 is disengaged and the spring 264 retracts the cup from the carrier.

As shown in Figs. 17, 19, and 21 a driving arm 330 is mounted as at 331 intermediate its end portions for pivotal movement in a substantially horizontal plane on the rearward support casting 46. Shown in plan view in Fig. 17, an eccentric 332 is provided in the shaft 203. A motivating arm 33 is connected to the eccentric and has driven connection with arm 330 through a universal ball and socket joint 334. Thus rotation of the shaft 203 imparts horizontal pivotal movement to the arm 330.

The end of the arm 330 opposite the universal joint 334 is bifurcated to fit over the piston 210 between the spaced collars 214 and through such association reciprocates the piston 210, and through the mechanism previously described the stuffing tube 212, in timed relation to the locating of a compartment of the carrier 58 at the stuffing station 62.

As indicated in Figs. 19 and 21 the bifurcated end of the arm 330 is extended beyond the shaft 210 for further driving connection. The portion of the rearward casting 46 mounting the shank members 165 and 166 is extended to the left as viewed in Fig. 19 and pivotally mounts a toggle link 336 on its extended end portion for pivotal movement in a substantially horizontal plane. This assembly is also shown in plan view in Figs. 22, 23, and 24, and in elevation in Fig. 28. A vertically offset pivot arm 337 is pivotally connected to the toggle link 336 and to the extended bifurcated end of the arm 330 as at 338 for pivotal movement in a substantially horizontal plane. The arm 337 is pivotally pinned to the shank members 165 and 166 as at 339 and 340, respectively. Upon pivotal movement of the arm 330, responsive pivotal movement is communicated to the arm 337 whereby the shank members 165 and 166, and the coring knife 107, or the coring knife 192 and guide member 193, are longitudinally reciprocated to and from the pitting station 61, on the blank station 153 and pitting station 61, respectively.

The means for revolving the polishing shaft 240, for driving the feed screw 280, for rotating the cylinder 295 and the rotor 300, and for reciprocating the charge cutting knife 301 and plunger 305 are best shown in Figs. 2, 7, 14, and 37. Attention is first directed to Fig. 7.

A telescopic shaft 345 is journaled at one end in a bearing 346 in the rearward support casting 46 and in a sleeve 347 adapted to keep the telescopic portions of the shaft in alignment. The sleeve is mounted in a bearing 348, also on the rearward support casting 46. A sprocket 349 is journaled on the sleeve 347 in alignment with the external sprocket teeth of the internal gear 86. A chain 350 provides driven connection between the internal gear 86 and the sprocket 49. The housing 85 is provided for the internal gear, sprocket, and chain, having one end portion mounted in the frame 40 and the other end portion supported by a bearing formation 352 journaled on the sleeve 347. The shaft is mounted as described longitudinally in the upper portion of the device for convenient driven connection with the charge cutting device.

The sprocket 349 has a receptacle 355 formed axially therein. A drive collar 356 having an axially extending boss 357 adapted to engage the receptacle 355, is fixedly mounted on the shaft 345. When the boss is disengaged from the receptacle, the sprocket 349 turns on the sleeve 347 and the shaft 345 remains stationary. Driven connection between the sprocket and shaft is effected by engaging the boss with the receptacle.

For convenience in engaging and disengaging the boss 357 of the drive collar 356 with the receptacle 355 of the sprocket 349, a manually manipulable clutch lever 359 is pivotally mounted as at 360 in the rearward support casting 46 for movement in a substantially vertical plane. (See Fig. 2.) A link 361 is pivotally mounted at 362 on the housing 251 and has a bifurcated end portion extended to engagement with the shaft 345 outwardly of the collar 356, and in abutting relation with said collar. A universal ball and socket joint 364 provides connection between the lever 359 and the link. A pulley 365 is mounted on the shaft 345 outwardly of the collar 356 and in abutting relation with the bifurcated end of the link 361. Pivotal movement of the lever 359 longitudinally positions the outer end of the telescopic shaft 345 to engage and disengage the collar 356 with the sprocket 349.

A bearing sleeve 367 is mounted in the rearward support casting 46 substantially parallel to the shaft 345. A shaft 368 is journaled in the bearing sleeve 367 and has an end portion adjacent to the bevel gear 248 and in opposite end portion terminating in substantial alignment with the pulley 365. A pulley 369 is mounted on the shaft 368 and a V belt 370 provides driving connection between said pulley and pulley 365. A bevel gear 371 is mounted on the opposite end of the shaft 368 and provides driving connection between the shaft and the bevel gear 248 and polishing shaft 240. The polishing shaft 240 is rotated at a high speed at all times that the boss 358 is seated in the receptacle 355.

To by-pass the hopper 56 in providing motivation of the feed screw 280, a shaft 373 (Figs. 2 and 3) is journaled in the frame as at 374 parallel to the shaft 345. A pair of spur gears 375 provide driven connection between the shaft 345 and shaft 373. To achieve the correct direction of rotation of the feed screw 280 and desired driving speed, a stub shaft 376 is journaled in the frame adjacent to the shaft 373 and driving connection provided therebetween by a pair of spur gears 377. A spur gear 378 and a sprocket 379 are mounted on the stub shaft 376 for unitary rotational movement. A chain 380 provides driving connection between the sprocket 379 and the sprocket 286. As shown in Fig. 3, an idler pulley 381 is pivotally mounted as at 382 for movement against the chain 380 and a spring 383 arranged to urge the idler pulley into tightening engagement with the chain. When the drive collar 356 has driven connection with the sprocket 349 the feed screw 280 is rotated through the linkage described.

To reciprocate the charge cutting knife 304 and plunger 305, a crank portion 384 is formed in the shaft 345, as evident in Figs. 2, 7, 13, and 37. A bifurcated lever 385 is pivotally mounted as at 386 and provides a slot 387 slidably receiving the crank 384 whereby rotation of the shaft 345 and crank 384 pivotally reciprocate the lever. The lever has a bifurcated end portion 388. The links 315 interconnect the outer sleeve 307 and each of the legs of the bifurcated end portion 388. Thus, rotation of the shaft 345 by engagement of the collar 356 with the sprocket 349 vertically reciprocates the cutting knife 304 and plunger 305 synchronously with the reciprocation of the feed tube 212 and piston 210 as previously described.

To drive the rotor 300 and cylinder 295 to turn stuffing material within the charge cutting chamber 66, a shaft 390 is rotatably mounted parallel to the shaft 345 and adjacent to the spur gears 296 and 303 as shown in Figs. 1, 2, 7, 13 and 14.

The shaft 390 mounts spur gears 391 and 392 in mesh with spur gears 396 and 303, respectively. As seen in Fig. 14, a depending arm 393 is pivotally mounted eccentrically of the shaft 345. A ratchet wheel 394 is mounted on the shaft 390 in the plane of the arm 393. A radius arm 395 is journaled on the shaft 394 and is pivotally connected to the depending lower end portion of the arm 393 whereby the arm and the ratchet wheel are held in operable association. A pawl 396 is mounted in the arm 393 for engagement with the ratchet wheel 394 whereby rotation of the shaft 345 reciprocates the arm 393 and imparts stepped rotation to the shaft 394 by engagement of the pawl 396 with the ratchet wheel and thus stepped corresponding rotational movement to the spur gears 296 and 303 and their respective cylinder 295 and rotor 300. The rotation of the cylinder and rotor serves to impart stepped rotation to stuffing material in the charge metering compartment 66 as material is compacted therein intermediate cutting strokes of the knife 304 therethrough. The gear, sprocket and pulley ratios are such that the engagement of the drive collar 356 with the sprocket 349 can motivate the elements driven thereby in the previously described synchronous arrangement with the stepped rotation of the carrier 58.

*Operation*

The operation of the device of the present invention is clearly apparent and briefly reviewed at this point. Stuffing material such as pimento, nuts, anchovies, celery, onions, or other desired stuffing material is deposited in the hopper 56. Cup elements 76 of a size adapted to receive in association with the pathway 70 individual fruit of the type desired to be pitted and stuffed, are mounted in the clip 77 on the chains 75. Fruits suitable for use in the cup 76 is deposited in the bin or hopper 55. A liquid may be employed in the bin to impart buoyancy to the fruit as desired.

The nut 309 is adjusted to bring the cutting knife 304 and plunger 305 into a relationship forming a compartment in the lower end of the cutting knife of the size desired in charges of stuffing material subsequently to be compacted in the fruit.

The knurled wheel 288 is rotated to compact stuffing material into the compartment 66 so that stuffing material will be promptly available for the cutting knife. So adjusted the apparatus of the present invention is pre-conditioned for operation.

The motor 81 is energized causing the conveyor cups 76 to be driven upwardly over the pathway 70 including the corrugations 71 and to deliver the fruit gravitated into the cups in the bin 55 into the position shown at 103, in Fig. 7. The mechanical hand 59 transfers the fruit individually from said position into the trough 120. The loading plunger 148 moves the fruit from the hand into a compartment in the carrier 58 which is rotated in stepped progression, as previously described, for arrangement of the compartments successively at the various stations. The succeeding step of the carrier locates the fruit at the so-called blank station 153. If the fruit is small, the coring knife 192 is brought to bear on the end of the fruit in this station forming an opening for subsequent ejection of the pit at the pitting station by the punch 183. When larger fruit is employed, the coring knife 292 is not employed and nothing is done to the fruit at said station other than it is engaged by the retaining member 154. On such larger fruit, the coring knife 170 cores the fruit at the pitting station 61 and the punch 183 ejects the pit therethrough, as previously described. The pits gravitationally descend from the pitting station 61 and may be accumulated in any suitable container, as desired.

The successive step of the carrier brings cored and pitted fruit to the stuffing station 62. The stuffing tube 216 is inserted into the cored opening of the fruit and the piston 210 ejects the charge of stuffing material from the tube previously delivered thereto in a metered amount by the charge cutting knife 304 and plunger 305.

At the polishing station 63, the buffer 259 is brought to bear against compacted stuffing material in the fruit and rotated by the shaft 240 to impart a gloss to the stuffing.

The reciprocation of the member 271 brings the leg 272 against the stuffed and polished fruit at the loosening station 64 and the fruit is urged partially from the carrier 58 into engagement against the resiliently mounted cup 268.

At the succeeding station the ejecting leg 273 of the member 271 dislodges the fruit previously loosened for gravitationally descending to the fruit bin 276.

In actual operation, the device of the present invention is found to produce stuffed fruit of high quality and desired uniformity. The complete elimination of all hand operations obviate major labor expenses. The minimizing of the handling of the fruit by the employment of the device of the present invention to pit, stuff, and polish the fruit, reduces the handling damages to an insignificant factor. The minimized handling is also found conducive to the elimination of loss of stuffing material after the stuffing operation has been completed.

The apparatus handles a continuous flow of fruit in bulk delivered to the bin 55, meters and aligns the fruit as it is conveyed therefrom, and automatically cores, pits, stuffs, and polishes the fruit. The device is simple in character, dependable in operation, and economical to employ. The savings incident to use of the machine makes possible a reduction in the retail price of stuffed fruits, such as olives, dates and the like, to fractions of their previous high costs required by manual pitting and stuffing making possible the exploitation of increased markets by reduced sales prices.

The unitary structure for pitting, stuffing, and polishing not only has the obvious convenience advantages but obviates any requirement for re-aligning the fruit for the various operations. The maintenance of the fruit in a constant position in the carrier during coring, pitting, stuffing, and polishing achieves an accuracy not possible where such functions are performed in separate machines through which the fruit is successively passed.

Although I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent constructions.

Having described my invention, what I claim as new and desire to secure by Letters Patent is:

1. In an olive pitting and stuffing machine the combination of a circular carrier mounted for rotation about a concentric horizontal rotational axis and having compartments formed horizontally therethrough in an annular arrangement concentrically of the carrier, said compartments each having an enlarged opening at one side of the carrier, a central portion adapted to receive olives in fitted relation therein with the major axis of the olives longitudinally disposed in their respective compartments, and an opening of reduced diameter extended from the central portion of the compartments to the opposite face of the carrier; means rotating the carrier in stepped progression momentarily simultaneously locating successive compartments at a loading station, a pitting station, a stuffing station, a packing and buffing station, and a release station; a hopper adapted to receive olives in bulk; a trough horizontally mounted at the loading station in alignment with the compartments successively located therein at the enlarged open ends thereof; means individually conveying olives from the hopper to the trough and aligning the olives in the trough with the compartments successively located at the loading station; a ram mounted for reciprocal horizontal movement longitudinally of the trough to urge olives therefrom into the compartments of the carrier; a coring knife mounted at the pitting station for reciprocal longitudinal movement to and from the openings of reduced diameter of the compartments therepositioned; a pitting punch mounted in substantial alignment with the coring knife at the opposite side of the carrier for reciprocal movement to and from compartments located at the pitting station; a stuffing tube mounted for longitudinal reciprocal movement to and from the openings of reduced diameter of the compartments momentarily located at the stuffing station for engagement with openings previously formed in the fruit by the coring knife; means supplying measured charges of stuffing material to the stuffing tube while said tube is withdrawn from the compartments; a piston slidably mounted in the stuffing tube to urge stuffing material located therein into the olives while the tube is in olive engagement; a rotatable buffer mounted for horizontal reciprocal movement to and from the openings of reduced diameter of the compartments located at the packing and buffing station; retaining means mounted for horizontal reciprocal movement at the pitting, stuffing, and packing and buffing stations adapted to overlie the enlarged ends of the openings of compartments located therein; an ejector mounted at the ejection station for horizontal reciprocal movement to and from the opening of reduced diameter of the compartments momentarily therepositioned; and motivating means simultaneously moving the carrier in said stepped progression and the olive conveying means to transfer olives from the hopper to the trough and subsequently simultaneously motivating the ram individually to load olives into the compartments from the trough, the coring knife into the compartments at the coring station, the stuffing tube into compartments at the stuffing station, rotating the buffer and moving the same into engagement with stuffing material previously located in the olives while momentarily positioned at the packing and buffing station, the retaining means toward the carrier at the pitting station, and packing and buffing stations, and the ejector into compartments in the ejecting station and subsequently in synchronous relation reciprocating the pitting punch into the compartments at the pitting station while the coring knife is extended into said compartment, and reciprocating the plunger in the stuffing tube to eject stuffing material from said tube while the tube is extended into olives in the stuffing station.

2. In an olive pitting and stuffing machine having a circular carrier mounted for rotation about a concentric horizontal rotational axis and having compartments formed horizontally therethrough in an annular arrangement concentrically of the carrier, said compartments each having an enlarged opening at one side of the carrier, a central portion adapted to receive olives in fitted relation therein with the major axis of the olives longitudinally disposed in their respective compartments, and an opening of reduced diameter extended from the central portion of the compartments to the opposite face of the carrier; means rotating the carrier in stepped progression successively locating the compartments at a predetermined loading station; and a hopper adapted to receive olives in bulk, the combination of a trough horizontally mounted at the loading station in alignment with the compartments successively located therein at the enlarged open ends thereof, means individually conveying olives from the hopper to the trough and aligning the olives in the trough with the compartments successively located at the loading station, a ram mounted for reciprocal movement longitudinally of the trough to urge olives therefrom into the compartments of the carrier, and means for reciprocating the ram longitudinally of the trough intermediate stepped progression of the carrier whereby olives are individually thrust into compartments successively located in the loading station and caused to conform in fitted engagement with the central portions of their respective compartments.

3. In an olive pitting machine the combination of a circular carrier mounted for rotation about a concentric horizontal rotational axis and having compartments formed horizontally therethrough in an annular arrangement concentrically of the carrier, said compartments each having an enlarged opening at one side of the carrier, a central portion adapted to receive olives in fitted relation therein with the major axis of the olives longitudinally disposed in their respective compartments, and an opening of reduced diameter extended from the central portion of the compartments to the opposite face of the carrier; means rotating the carrier in stepped progression momentarily simultaneously locating successive compartments at a loading station, a pitting station, and a release station; a hopper adapted to receive olives in bulk; a trough horizontally mounted at the loading station in alignment with the compartments successively located therein at the enlarged open ends thereof; means individually conveying olives from the hopper to the trough and aligning the olives in the trough with the compartments successively located at the loading station; a ram mounted for reciprocal horizontal movement longitudinally of the trough to urge olives therefrom into the compartments of the carrier; a coring knife mounted at the pitting station for reciprocal longitudinal movement to and from the openings of reduced diameter of the compartments therepositioned; a pitting punch mounted in substantial alignment with the coring knife at the opposite side of the carrier for reciprocal movement to and from compartments located at the pitting station; retaining means mounted for horizontal reciprocal movement at the pitting station adapted to overlie the enlarged ends of the openings of compartments located therein; an ejector mounted at the ejection station for horizontal reciprocal movement to and from the opening of reduced diameter of the compartments momentarily therepositioned; and motivating means simultaneously moving the carrier in said stepped progression and the olive conveying means to transfer olives from the hopper to the trough and subsequently simultaneously motivating the ram individually to load olives into the compartments from the trough, moving the retaining means toward the carrier at the pitting station, and the ejector into compartments in the ejecting station and subsequently in synchronous relation thereto reciprocating the pitting punch into the compartment at the pitting station all intermediate stepped progression of the carrier.

4. In an olive pitting and stuffing machine the combination of a circular carrier mounted for rotation about a concentric horizontal rotational axis and having compartments formed horizontally therethrough in an annular arrangement concentrically of the carrier, said compartments each having an enlarged opening at one side of the carrier, a central portion adapted to receive olives in fitted relation therein with the major axis of the olives longitudinally disposed in their respective compartments, and an opening of reduced diameter extended from the central portion of the compartments to the opposite face of the carrier; means rotating the carrier in stepped progression momentarily simultaneously locating successive compartments at a loading station, a pitting station, a stuffing station, and a release station; a hopper adapted to receive olives in bulk; a trough horizontally mounted at the loading station in alignment with the compartments successively located therein at the enlarged open ends thereof; means individually conveying olives from the hopper to the trough and aligning the olives in the trough with the compartments successively located at the loading station; a ram mounted for reciprocal horizontal movement longitudinally of the trough to urge olives therefrom into the compartments of the carrier; a coring knife mounted at the pitting station for reciprocal longitudinal movement to and from the openings of reduced diameter of the compartments therepositioned; a pitting punch mounted in substantial alignment with the coring knife at the opposite side of the carrier for reciprocal movement to and from compartments located at the pitting station; a stuffing tube mounted for longitudinal reciprocal movement to and from the openings of reduced diameter of the compartments momentarily located at the stuffing station for engagement with openings previously formed in the fruit by the coring knife; means supplying measured charges of stuffing material to the stuffing tube while said tube is withdrawn from the compartments; a piston slidably mounted in the stuffing tube to urge stuffing material located therein into the olives while the tube is in olive engagement; retaining means mounted for horizontal reciprocal movement at the pitting and stuffing stations adapted to overlie the enlarged ends of the openings of compartments located therein; an ejector mounted at the ejection station for horizontal reciprocal movement to and from the opening of reduced diameter of the compartments momentarily therepositioned; and motivating means simultaneously moving the carrier in said stepped progression and the olive conveying means to transfer olives from the hopper to the trough and subsequently simultaneously motivating the ram individually to load olives into the compartments from the trough, the coring knife into the compartments at the coring station, the stuffing tube into compartments at the stuffing station, the retaining means toward the carrier at the pitting station, and the ejector into compartments in the ejecting station and subsequently in synchronous relation reciprocating the pitting punch into the compartments at the pitting station while the coring knife is extended into said compartment, and reciprocating the plunger in the stuffing tube to eject stuffing material from said tube while the tube is extended into olives in the stuffing station.

5. In an olive pitting and stuffing machine the combination of a carrier having a plurality of olive receiving compartments therein; means for advancing the carrier in stepped progression momentarily simultaneously locating successive compartments at a predetermined loading station, pitting station, stuffing station, packing and buffing station, and a release station; means at the loading station adapted to load olives into the compartments of the carrier successively located at the loading station; a coring knife mounted at the pitting station for reciprocal longitudinal movement to and from the compartments of the carrier successively located at the pitting station; a pitting punch mounted in substantial alignment with the coring knife at the opposite side of the carrier for reciprocal movement to and from compartments located at the pitting station; a stuffing tube mounted at the stuffing station for longitudinal reciprocal movement to and from compartments momentarily located at the stuffing station for engagement with openings previously formed in the fruit by the coring knife; means supplying measured charges of stuffing material to the stuffing tube while said tube is withdrawn from the compartments; a piston slidably mounted in the stuffing tube to urge stuffing material located therein into the olives while the tube is in olive engagement; a rotatable buffer mounted for horizontal reciprocal movement to and from the compartments located at the packing and buffing station; an ejector mounted at the ejection station for horizontal reciprocal movement to and from the compartments momentarily therepositioned; and motivating means simultaneously moving the carrier in stepped progression and intermediate the steps of progression of the carrier motivating the olive delivering means to load compartments at the loading station, the coring knife into the compartments at the coring station, the stuffing tube into compartments at the stuffing station, rotating the buffer and moving the same into engagement with stuffing material previously located in the olives while momentarily positioned at the packing and buffing station, and the ejector into the compartments in the ejection station and subsequently in synchronous relation reciprocating the pitting punch into the compartments at the pitting station while the coring knife is extended into said compartment, and reciprocating the plunger in the stuffing tube to eject stuffing material from said tube while the tube is extended into olives in the stuffing station.

References Cited in the file of this patent

UNITED STATES PATENTS

| Number | Name | Date |
|---|---|---|
| 292,393 | Williams | Jan. 22, 1884 |
| 663,206 | Wolff | Dec. 4, 1900 |
| 667,423 | Brown | Feb. 5, 1901 |
| 686,875 | Wolff | Nov. 19, 1901 |
| 749,697 | Middlekauff et al. | Jan. 22, 1904 |
| 1,238,217 | Thompson | Aug. 28, 1917 |
| 1,392,690 | Leonard | Oct. 4, 1921 |
| 1,402,488 | Fooks | Jan. 3, 1922 |
| 1,502,929 | Tuttle | July 29, 1924 |
| 2,059,163 | Wolff | Oct. 27, 1936 |
| 2,075,752 | Rowe | Mar. 30, 1937 |
| 2,092,786 | Taylor | Sept. 14, 1937 |
| 2,096,264 | Schutz | Oct. 19, 1937 |
| 2,190,970 | Ashlock, Jr. | Feb. 20, 1940 |
| 2,254,594 | Carroll | Sept. 2, 1941 |
| 2,283,714 | Wolff | May 19, 1942 |
| 2,341,857 | Drake | Feb. 15, 1944 |
| 2,360,103 | Britten | Oct. 10, 1944 |
| 2,382,961 | Coons | Aug. 21, 1945 |
| 2,597,933 | Hungate | May 27, 1952 |

FOREIGN PATENTS

| Number | Country | Date |
|---|---|---|
| 319,731 | Great Britain | Aug. 13, 1929 |